US012097459B2

(12) United States Patent
Brown

(10) Patent No.: US 12,097,459 B2
(45) Date of Patent: Sep. 24, 2024

(54) FLUTED FILTRATION MEDIA, FILTRATION MEDIA PACKS, AND FILTRATION ELEMENTS

(71) Applicant: Donaldson Company, Inc., Minneapolis, MN (US)

(72) Inventor: Scott M. Brown, Faribault, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 776 days.

(21) Appl. No.: 16/640,675

(22) PCT Filed: Aug. 14, 2018

(86) PCT No.: PCT/US2018/046726
§ 371 (c)(1),
(2) Date: Feb. 20, 2020

(87) PCT Pub. No.: WO2019/040324
PCT Pub. Date: Feb. 28, 2019

(65) Prior Publication Data
US 2020/0360852 A1 Nov. 19, 2020

Related U.S. Application Data

(60) Provisional application No. 62/548,639, filed on Aug. 22, 2017.

(51) Int. Cl.
*B01D 46/52* (2006.01)
*B01D 29/03* (2006.01)
*B01D 29/07* (2006.01)

(52) U.S. Cl.
CPC ......... *B01D 46/522* (2013.01); *B01D 29/031* (2013.01); *B01D 29/073* (2013.01);
(Continued)

(58) Field of Classification Search
None
See application file for complete search history.

(56) References Cited

U.S. PATENT DOCUMENTS 6,273,938 B1   8/2001  Fanselow et al.
6,482,247 B2  11/2002  Jaroszczyk et al.
(Continued)

FOREIGN PATENT DOCUMENTS

CN   1568217 A   1/2005
CN   1623636 A   6/2005
(Continued)

OTHER PUBLICATIONS

International Patent Application No. PCT/US2018/046726, filed Aug. 14, 2018; International Search Report and Written Opinion issued Jan. 11, 2019; 14 pages.
(Continued)

*Primary Examiner* — Brit E. Anbacht
(74) *Attorney, Agent, or Firm* — Mueting Raasch Group

(57) ABSTRACT

Filtration media, media packs, and filtration elements are described, including fluted filtration media having offset flutes arranged to intermittently contact flutes on adjacent media, including angled and curved flutes. Pleated filtration media with alternating sealed pleat edges are also disclosed, including fluted media with alternating sealed flutes. A media pack can have a first sheet of media and a second sheet of media. The first sheet of media can have a first plurality flutes defining first flute valleys extending between a first face and a second face of the media pack. The second sheet of media can have a second plurality of flutes defining second flute peaks extending between the first face and the second face of the media pack. The first plurality of flutes
(Continued)

can be non-parallel to the second plurality of flutes, and each first flute valley contacts one second flute peak at a discrete contact point.

20 Claims, 20 Drawing Sheets

(52) U.S. Cl.
CPC ......... *B01D 46/526* (2013.01); *B01D 46/527* (2013.01); *B01D 2275/105* (2013.01); *B01D 2275/20* (2013.01)

(56) References Cited

U.S. PATENT DOCUMENTS

| | | | |
|---|---|---|---|
| 6,673,136 | B2 | 1/2004 | Gillingham et al. |
| 6,955,775 | B2 | 10/2005 | Chung et al. |
| 7,270,693 | B2 | 9/2007 | Chung et al. |
| 8,545,589 | B2 | 10/2013 | Rocklitz et al. |
| 9,254,460 | B2 | 2/2016 | Gehwolf et al. |
| 2003/0070406 | A1 | 4/2003 | Duffy |
| 2007/0056444 | A1* | 3/2007 | Garikipati ............ B01D 46/525 96/135 |
| 2009/0127211 | A1* | 5/2009 | Rocklitz .............. B01D 46/526 210/493.4 |
| 2014/0208705 | A1 | 7/2014 | Krull |
| 2015/0375142 | A1 | 12/2015 | Rocklitz |
| 2017/0197165 | A1 | 7/2017 | Schwartz et al. |
| 2017/0216757 | A1* | 8/2017 | Ouyang ............... B01D 46/522 |
| 2019/0009204 | A1* | 1/2019 | Schwartz ............. B01D 46/522 |
| 2021/0205752 | A1* | 7/2021 | Sala .................... B01D 46/527 |

FOREIGN PATENT DOCUMENTS

| | | |
|---|---|---|
| CN | 1968733 | 5/2007 |
| CN | 106573184 A | 4/2017 |
| CN | 106925051 | 7/2017 |
| EP | 1990510 A1 | 11/2008 |
| JP | S57-140618 | 8/1982 |
| JP | S57-140618 A3 | 8/1982 |
| JP | S57140618 A | 8/1982 |
| JP | S61-78215 | 5/1986 |
| JP | 2010531731 | 9/2010 |
| JP | 2011-511705 | 4/2011 |
| JP | 2013-500863 | 1/2013 |
| RU | 2438754 | 1/2012 |
| RU | 2438754 C2 | 1/2012 |
| WO | 2005/077487 A1 | 8/2005 |
| WO | 2005/107924 A2 | 11/2005 |
| WO | 2005/107924 A3 | 11/2005 |
| WO | 2009/100067 | 8/2009 |
| WO | 2010/011910 A2 | 1/2010 |
| WO | 2011/017352 | 2/2011 |
| WO | 2011/091432 A1 | 7/2011 |
| WO | 2012/005623 A1 | 1/2012 |

OTHER PUBLICATIONS

International Patent Application No. PCT/US2018/046726, filed Aug. 14, 2018; Invitation to Pay Additional Fees issued Nov. 8, 2018; 10 pages.
International Patent Application No. PCT/US2018/046726, filed Aug. 14, 2018; International Preliminary Report on Patentability issued Feb. 25, 2020; 10 pages.

* cited by examiner

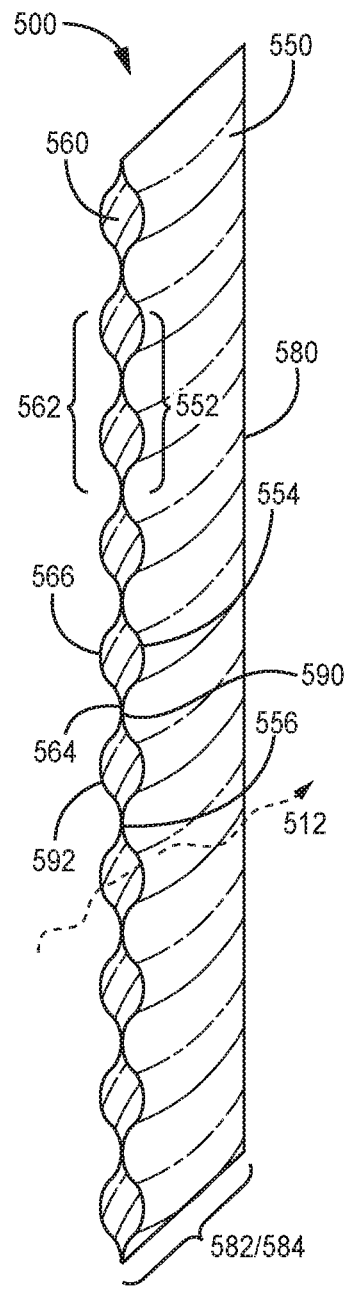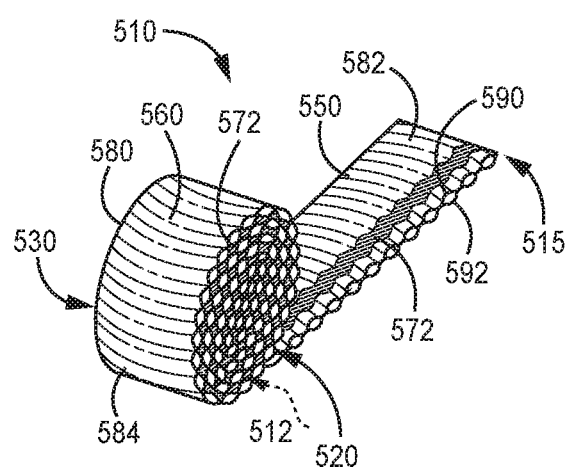
FIG. 20
FIG. 21

FLUTED FILTRATION MEDIA, FILTRATION MEDIA PACKS, AND FILTRATION ELEMENTS

This application is the § 371 U.S. National Stage of International Application No. PCT/US2018/046726, filed Aug. 14, 2018, in the name of Donaldson Company, Inc., a U.S. national corporation, applicant for the designation of all countries and Scott M. Brown, a U.S. Citizen, inventor for the designation of all countries, and claims priority to U.S. Provisional Application No. 62/548,639, filed Aug. 22, 2017, the contents of which are herein incorporated by reference in their entireties.

FIELD

The present disclosure is directed to filtration media, filtration media packs, and filtration elements. In particular, the disclosure is directed to filtration media containing flutes, and filtration media packs and elements formed with filtration media containing flutes.

BACKGROUND

Fluid streams, such as gases and liquids, often carry contaminant material. In many instances, it is desired to filter some or all of the contaminant material from the fluid stream. For example, air flow streams to engines for motorized vehicles or for power generation equipment, gas streams to gas turbine systems, and air streams to various combustion furnaces, typically carry particulate contaminants that should be removed prior to delivery of the air flow to the vehicle, turbine, or combustion furnace. Also liquid streams in engine lubrication systems, hydraulic systems, coolant systems, and fuel systems often carry contaminants that should be removed from the liquid stream. It is desirable for such systems, that selected contaminant material be removed from (or have its level reduced in) the gaseous or liquid fluid. A variety of fluid filter arrangements have been developed for contaminant reduction. In general, however, continued improvements are sought.

SUMMARY

The current technology relates to a filtration media pack. The filtration media pack has a first sheet of filtration media and a second sheet of filtration media. The first sheet of filtration media has a first plurality of parallel flutes defining first flute valleys extending between a first face of the media pack and a second face of the media pack. The second sheet of filtration media has a second plurality of parallel flutes defining second flute peaks extending between the first face of the media pack and the second face of the media pack. The first plurality of flutes are non-parallel to the second plurality of flutes. Each first flute valley contacts one second flute peak at a discrete contact point. An obstruction between the first sheet of filtration media and the second sheet of filtration media defines a fluid pathway extending through the first sheet of filtration media and the second sheet of filtration media in parallel.

In some embodiments, at least one first flute valley contacts two second flute peaks. In some embodiments, at least one first flute valley contacts three second flute peaks. In some embodiments, at least one first flute valley contacts four second flute peaks. In some embodiments, at least one first flute valley contacts four second flute peaks but less than second flute peaks.

Additionally or alternatively, each of the first plurality of flutes and the second plurality of parallel flutes are not perpendicular to the first face and the second face of the media pack. Additionally or alternatively, the first plurality of flutes is offset relative to the second plurality of flutes by at least 5 degrees. Additionally or alternatively, the first plurality of flutes is offset relative to the second plurality of flutes by at least 10 degrees. Additionally or alternatively, the first plurality of flutes is offset relative to the second plurality of flutes by at least 20 degrees. Additionally or alternatively, the first plurality of flutes is substantially straight. Additionally or alternatively, the second plurality of flutes are substantially straight.

Additionally or alternatively, each of the first plurality of flutes define a curve between the first face and the second face of the media pack. Additionally or alternatively, the curve of a peak of a flute in the first plurality of flutes extends outward from an axis joining the peak at each end of the flute by at least 5% of the flute length. Additionally or alternatively, the curve of a peak of a flute in the first plurality of flutes extends outward from an axis joining the peak at each end of the flute by at least 10% of the flute length. Additionally or alternatively, the curve of a peak of a flute in the first plurality of flutes extends outward from an axis joining the peak at each end of the flute by at least 20% of the flute length.

Additionally or alternatively, the second plurality of flutes are curved. Additionally or alternatively, the first plurality of flutes form first curves, the second plurality of flutes form second curves, and the first curves have a curvature pitch that is opposite the curvature pitch of the second curves. Additionally or alternatively, the first sheet of filtration media and the second sheet of filtration media are continuous and separated by a fold. Additionally or alternatively, the first media sheet and the second media sheet define a cylindrical media pack with a wound cross-section. Additionally or alternatively, the first media sheet and the second media sheet are discontinuous. Additionally or alternatively, the first media sheet and the second media sheet define a cylindrical media pack with a wound cross-section. Additionally or alternatively, the obstruction is a glue bead between the first media sheet and second media sheet. Additionally or alternatively, the filtration media pack exhibits a flute density of at least about 40 flutes/inch$^2$.

Additionally or alternatively, the media pack has an asymmetric volume arrangement such that an upstream volume of the media pack is greater than a downstream volume by at least 10%. Additionally or alternatively, the media pack has an asymmetric volume arrangement so that a volume on one side of the media pack is greater than a volume on another side of the media pack by at least 30%. Additionally alternatively, the media pack has a seal member extending around a periphery of the media pack.

Some embodiments of the current technology are related to a pleated filtration media pack having filtration media having a first set of pleat folds forming an inlet face of the media pack and a second set of pleat folds forming an outlet face of the media pack, such that the filtration media extends between the first set of pleat folds and the second set of pleat folds to define a plurality of sheets of filtration media. A plurality of flutes are defined by each of the sheets of filtration media, where each of the flutes extend the inlet face and outlet face of the media pack. The sheets of filtration media have pleat ends extending from the inlet face of the media pack to the outlet face of the media pack. The pleat ends define a first side face and second side face, where the first side face and second side face are opposite froth one another. In such embodiments, the inlet face is substantially parallel with the outlet face and the first side face is substantially parallel with the second side face, but the first side face intersects the inlet face at an angle of less than 90°.

In some such embodiments, the plurality of flutes defined by a sheet of filtration media are parallel. Additionally or alternatively, a first plurality of flutes defined by a first sheet of filtration media are non-parallel to a second plurality of flutes defined by an adjacent second sheet of filtration media.

In some embodiments, each of the first plurality of flutes defines a first flute peak extending between the inlet face and outlet face of the media pack, and each of the second plurality of flutes defines a second flute peak extending between the inlet face and outlet face of the media pack, and each first flute peak contacts one second flute peak at a discrete point. Additionally or alternatively, at least one first flute peak contacts two second flute valley. Additionally or alternatively, at least one first flute peak contacts three second flute valleys. Additionally or alternatively, at least one first flute peak contacts four second flute valleys. Additionally or alternatively, at least one first flute peak contacts two but less than ten second flute valleys.

Additionally or alternatively, first plurality of flutes is angularly offset relative to the second plurality of flutes by at least 5 degrees. Additionally or alternatively, the first plurality of flutes is angularly offset relative to the second plurality of flutes by at least 10 degrees. Additionally or alternatively, the first plurality of flutes is angularly offset relative to the second plurality of flutes by at least 20 degrees. Additionally or alternatively, the first plurality of flutes are substantially straight. Additionally or alternatively, the second plurality of flutes are substantially straight.

Additionally or alternatively, the media pack has an asymmetric volume arrangement so that a volume on one side of the media pack is greater than a volume on another side of the media pack by at least 10%. Additionally or alternatively, the media pack has an asymmetric volume arrangement so that a volume on one side of the media pack is greater than a volume on another side of the media pack by at least 50%. Additionally or alternatively, the media pack has a seal member extending around a periphery of the media pack. Other embodiments are also disclosed.

The above summary of the present technology is not intended to describe each disclosed embodiment of the present technology. This is the purpose of the detailed description and claims that follows.

BRIEF DESCRIPTION OF THE DRAWINGS

The filtration media, media packs, and element can be more completely understood in consideration of the following detailed description of various embodiments of the technology in connection with the accompanying drawings, in which:

FIG. 20 is a perspective view of the web of fluted media of FIG. 18, constructed and arranged in accordance with various implementations, showing the media folded.

FIG. 21 is a perspective view of a filter element formed using the web of fluted media of FIG. 18 and FIG. 19.

Figure 1:
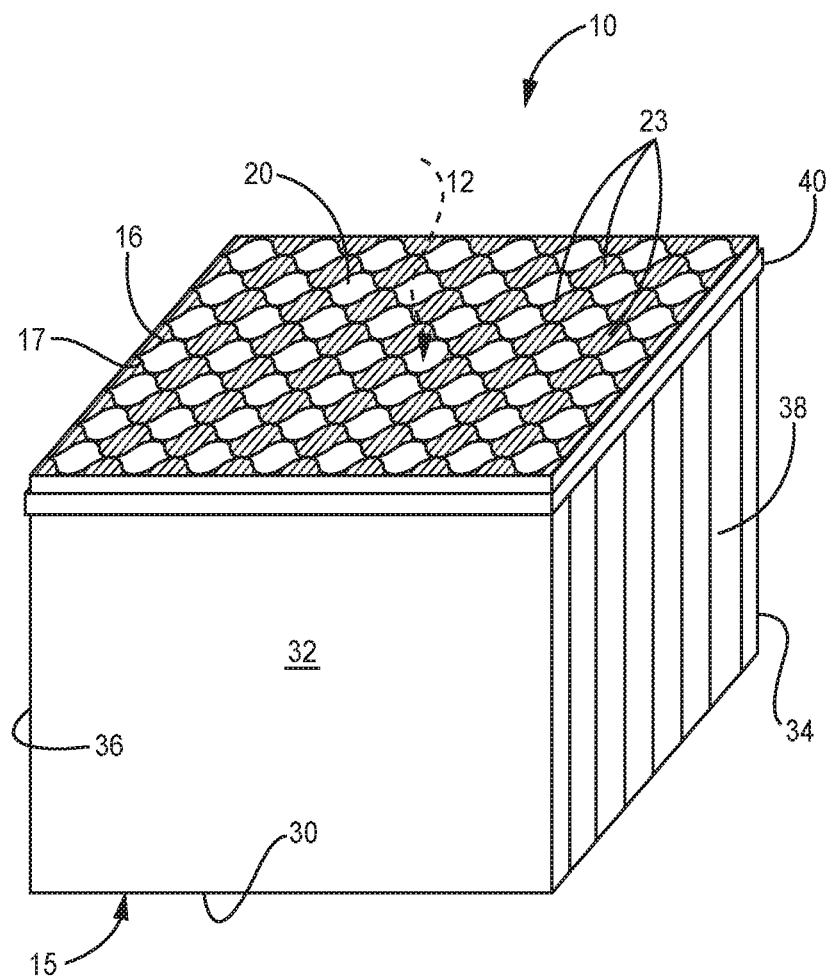
FIG. 1 is perspective view of a filter element constructed and arranged in accordance with an implementation.

While the technology is susceptible to various modifications and alternative forms, specifics thereof have been shown by way of example and drawings, and will be described in detail. It should be understood, however, that the technology is not limited to the particular embodiments described. On the contrary, the intention is to cover modifications equivalents, and alternatives falling within the spirit and scope of the invention.

DETAILED DESCRIPTION

The present application is directed to filtration media, media packs, and filtration elements. "Filtration media" is used herein to describe materials that are configured to filter fluids. "A sheet of filtration media" is defined as a portion of the filtration media that forms a single layer. "Media pack" refers to multiple sheets of the media in a layered configuration that cumulatively define an inlet, an outlet, and a fluid passageway extending from the inlet to the outlet through at least one sheet of media. "Filter element" refers to a media pack that is configured for installation into a system to filter fluids, typically with additional components such as a sealing member, support frame, handle, or other structures. "Flutes" as used herein is synonymous with the term "corrugations," which refers to a series of alternating elongate ridges/peaks, and elongate grooves/valleys.

In some implementations, a sheet of fluted filtration media a media pack defines flutes angularly offset from flutes defined on adjacent sheet(s) of fluted filtration media in the media pack such that the flutes intermittently contact flutes on adjacent sheet(s) of media. The flutes can be angled and curved flutes. In various implementations media packs consistent with the technology disclosed her have a pleated construction with pleat folds defining an inlet face and an outlet face. In various other implementations, media packs consistent with the technology disclosed herein have a layered, fluted sheet construction with alternating pairs of sheets sealed towards an inlet face and an outlet face to define a fluid passageway from the inlet to the outlet through at least one sheet of filter media. In some implementation, media packs consistent with the technology disclosed herein are cylindrical having a wound cross section.

The current technology relates to a filtration media pack. The filtration media pack has a first sheet of filtration media and a second sheet of filtration media. The first sheet of filtration media has a first plurality of parallel flutes defining first flute valleys extending between a first face of the media pack and a second face of the media pack. The second sheet of filtration media has a second plurality of parallel flutes defining second flute peaks extending between the first face of the media pack and the second face of the media pack. The first plurality of flutes are non parallel to the second plurality of flutes. Each first flute valley contacts one second flute peak at a discrete contact point. An obstruction between the first sheet of filtration media and the second sheet of filtration media defines a fluid pathway extending through the first sheet of filtration media and the second sheet of filtration media in parallel.

In some embodiments, at least one first flute valley contacts two second flute peaks. In some embodiments, at least one first flute valley contacts three second flute peaks. In some embodiments, at least one first flute valley contacts four second flute peaks. In some embodiments, at least one first flute valley contacts four second flute peaks but less than ten second flute peaks.

Additionally or alternatively, each of the first plurality of flutes and the second plurality of parallel flutes are not perpendicular to the first face and the second face of the media pack. Additionally or alternatively, the first plurality of flutes is offset relative to the second plurality of flutes by at least 5 degrees. Additionally or alternatively, the first plurality of flutes is offset relative to the second plurality of flutes by at least 10 degrees. Additionally or alternatively, the first plurality of flutes is offset relative to the second plurality of flutes by at least 20 degrees. Additionally or alternatively, the first plurality of flutes is substantially straight. Additionally or alternatively, the second plurality of flutes are substantially straight.

Additionally or alternatively the first plurality of flutes define a curve between the first face and the second face of the media pack. Additionally or alternatively, the curve of a peak of a flute in the first plurality of flutes extends outward from an axis joining the peak at each end of the flute by at least 5% of the flute length. Additionally or alternatively, the curve of a peak of a flute in the first plurality of flutes extends outward from an axis joining the peak at each end of the flute by at least 10% of the flute length. Additionally or alternatively, the curve of a peak of a flute in the first plurality of flutes extends outward from an axis joining the peak at each end of the flute by at least 20% of the flute length.

Additionally or alternatively, the second plurality of flutes are curved. Additionally or alternatively, the first plurality of flutes form first curves, the second plurality of flutes form second curves, and the first curves have a curvature pitch that is opposite the curvature pitch of the second curves. Additionally or alternatively, the first sheet of filtration media and the second sheet of filtration media are continuous and separated by a fold. Additionally or alternatively, the first media sheet and the second media sheet define a cylindrical media pack with a wound cross-section. Additionally or alternatively, the first media sheet and the second media sheet are discontinuous. Additionally or alternatively, the first media sheet and the second media sheet define a cylindrical media pack with a wound cross-section. Additionally or alternatively, the obstruction is a glue bead between the first media sheet and second media sheet. Additionally or alternatively, the filtration media pack exhibits a flute density of at least about 40 flutes/inch$^2$.

Additionally or alternatively, h media pack has an asymmetric volume arrangement such that an upstream volume of the media pack is greater than a downstream volume by at least 10%. Additionally or alternatively, the media pack has an asymmetric volume arrangement so that a volume on one side of the media pack is greater than a volume on another side of the media pack by at least 30%. Additionally or alternatively, the media pack has a seal member extending around a periphery of the media pack.

Some embodiments of the current technology are related to a pleated filtration media pack having filtration media having a first set of pleat folds forming an inlet face of the media pack and a second set of pleat folds forming an outlet face of the media pack, such that the filtration media extends between the first set of pleat folds and the second set of pleat folds to define a plurality of sheets of filtration media. A plurality of flutes are defined by each of the sheets of filtration media, where each of the flutes extend between the inlet face and outlet face of the media pack. The sheets of filtration media have pleat ends extending from the inlet face of the media pack to the outlet face of the media pack. The pleat ends define a first side face and second side face, where the first side face and second side face are opposite from one another. In such embodiments, the inlet face is substantially parallel with the outlet face and the first side face is substantially parallel with the second side face, but the first side face intersects the inlet face at an angle of less than 90°.

In some such embodiments, the plurality of flutes defined by a sheet of filtration media are parallel. Additionally or alternatively, a first plurality of flutes defined by a first sheet of filtration media are non-parallel to a second plurality of flutes defined by an adjacent second sheet of filtration media.

In some embodiments, each of the first plurality of flutes defines a first flute peak extending between the inlet face and outlet face of the media pack, and each of the second plurality of flutes defines a second flute peak extending between the inlet face and outlet face of the media pack, and each first flute peak contacts one second flute peak at a discrete point. Additionally or alternatively, at least one first flute peak contacts two second flute valley. Additionally or alternatively, at least one first flute peak contacts three second flute valleys. Additionally or alternatively, at least one first flute peak contacts four second flute valleys.

Additionally or alternatively, at least one first flute peak contacts two but less than ten second flute valleys.

Additionally or alternatively, the first plurality of flutes is angularly offset relative to the second plurality of flutes by at least 5 degrees. Additionally or alternatively, the first plurality of flutes is angularly offset relative to the second plurality of flutes by at least 10 degrees. Additionally or alternatively, the first plurality of flutes is angularly offset relative to the second plurality of flutes by at least 20 degrees. Additionally or alternatively, the first plurality of flutes are substantially straight. Additionally or alternatively, the second plurality of flutes are substantially straight.

Additionally or alternatively, the media pack has an asymmetric volume arrangement so that a volume on one side of the media pack is greater than a volume on another side of the media pack by at least 10%. Additionally or alternatively, the media pack has an asymmetric volume arrangement so that a volume on one side of the media pack is greater than a volume on another side of the media pack by at least 50%. Additionally or alternatively, the media pack has a seal member extending around a periphery of the media pack. Other embodiments are also disclosed.

Referring now to the drawings, FIG. 1 provides a perspective view of a filter element 10 constructed and arranged in accordance with an implementation. In this particular implementation, which is consistent with some embodiments, the filter element 10 has a media pack 15 having a plurality of sheets of filtration media including a first sheet of filtration media 16 and a second sheet of filtration media 17. The filter element 10 has a first face 20, a second face 30 (opposite the first face 20), and four side faces 32, 34, 36, and 38. The first face 20 can be an inlet and the second face 30 can be an outlet, although in some embodiments the first face 20 can be the outlet and the second face 30 can be the inlet. A seal member 40 extends around a periphery of the media pack 15. The seal member 40 abuts the perimeter of the first face 20 adjacent to where the four side faces 32, 34, 36, and 38 converge at the first face 20. In some embodiments the seal member can project outward from the first face 20 or the second face 30.

The filter element 10 is generally configured to be inserted into a housing and fluids to be filtered (such as an air stream) pass through a fluid pathway 12 of the filter element 10, entering at the first face 20 and exiting the filter element 10 at the second face 30. As will be explained in more detail below in the discussion of FIG. 4, the fluid pathway 12 extends through the first sheet of filtration media 16 and/or the second sheet of filtration media 17 in parallel.

Figure 2:
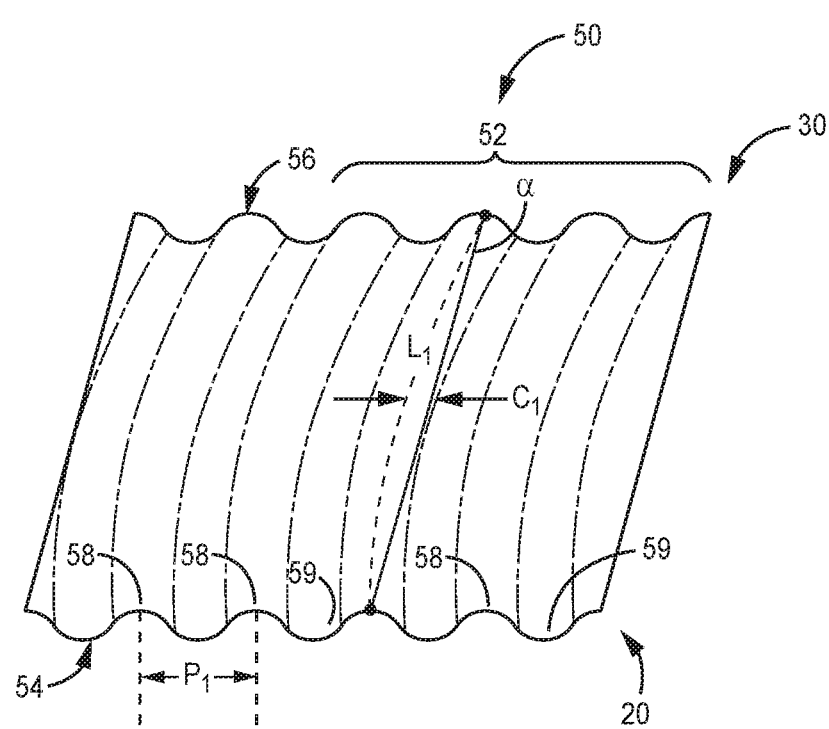
FIG. 2 is a perspective view of a first sheet of filtration media constructed and arranged in accordance with an implementation.
Figure 3:
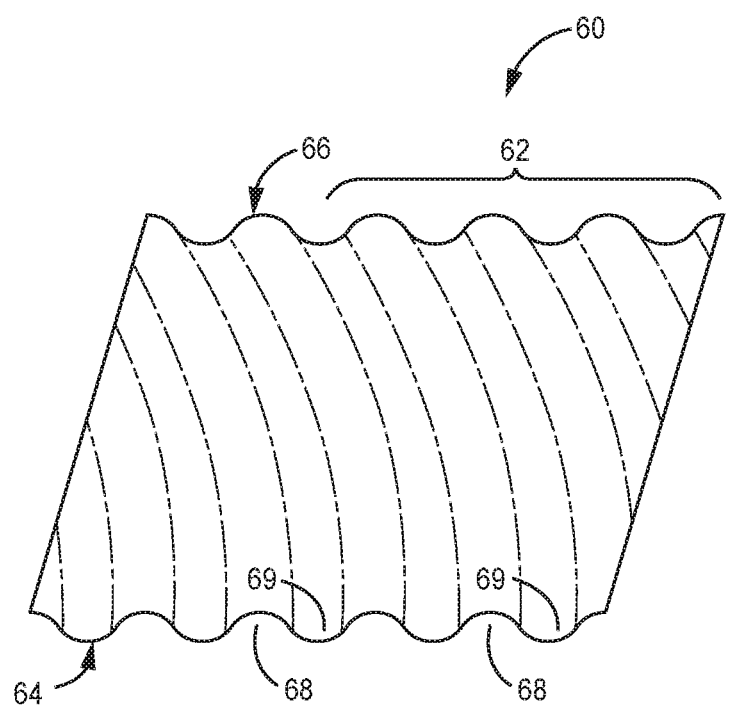
FIG. 3 is a perspective view of a second sheet of filtration media constructed and arranged in accordance with an implementation.

The filter element 10 of FIG. 1 is constructed of a plurality of alternating fluted media sheets 16, 17, examples of which are depicted in FIGS. 2 and 3, respectively. Specifically, FIG. 2 is a perspective view of a first sheet of filtration media 50 constructed and arranged in accordance with some implementations. The first sheet of filtration media 50 has a first plurality of parallel flutes 52 each extending between a first edge 54 and a second edge 56 of the first media sheet 50. The first edge 54 in the depicted embodiment corresponds to the first face 20 of the filter element 10 (FIG. 1), while second edge 56 corresponds to the second face 30 of the filter element 10. As such, the first plurality of flutes 52 extends between the first face 20 of the media pack 15 and the second face 30 of the media pack 15.

The first plurality of flutes 52 defines first flute peaks 58 and first flute valleys 59 extending between the first face 20 and the second face 30 of the media pack 15 (see FIG. 1). The first flute peaks 58 and the first flute valleys 59 protrude from opposite sides of the first sheet of filtration media 50.

Each flute in the first plurality of flutes 52 is parallel to the remainder of flutes in the first plurality of flutes 52. Flutes are considered parallel when at least the flute peaks and the flute valleys are parallel.

The flutes in the first plurality of flutes 52 are curved between the first face 20 and the second face 30 of the media pack 15 (FIG. 1). Curved flutes as referenced herein generally means that the flutes do not extend along a straight line between the first face of the media pack and the second face of the media pack. The flutes can define a single curve, such as depicted in FIG. 2, or multiple curves between the first face and the second face of the media pack. The curvature of the flutes can be reflected by a "curvature pitch" measurement, for example, which is the maximum distance a flute peak extends out from a straight-line axis a joining the peaks at each end of the flute, such as distance $C_1$ depicted in FIG. 2. This curvature can be measured in absolute number (such as centimeters) or relative to the length $L_1$ (see FIG. 2) of the flute, where the length of a flute is measured along a flute peak from one end of the flute to the opposite end of the flute. For example, the curvature pitch can be at least 5%, 10%, or even 20% of the length $L_1$ of the flute in certain embodiments.

In other examples, the curvature pitch can be characterized in terms of the "flute pitch" $P_1$ (see FIG. 2), which is the distance between adjacent peaks in the sheet of filtration media 50. In some embodiments the curvature pitch $C_1$ can be at least 10% of the flute pitch $P_1$ but less than 50 times the flute pitch $P_1$. In some embodiments the curvature pitch $C_1$ is between 10% and 50% of the flute pitch $P_1$. In some embodiments the curvature pitch $C_1$ is between 40% and 90% of the flute pitch $P_1$. In some embodiments the curvature pitch $C_1$ is between 80% and 200% of the flute pitch $P_1$. In some embodiments the curvature pitch $C_1$ is between 3 times and 10 times the flute pitch $P_1$. In some embodiments the curvature pitch $C_1$ is between 5 times and 20 times the flute pitch $P_1$. In some embodiments the curvature pitch $C_1$ is between 20 times and 50 times the flute pitch $P_1$.

FIG. 3 is a perspective view of a second sheet of filtration media 60 constructed and arranged in accordance with some implementations. The second sheet of filtration media 60 has a second plurality of flutes 62 extending between a first edge 64 and a second edge 66 of the second sheet of filtration media 60 (corresponding to the first face 20 and the second face 30 of the media pack 15, as described above). The second plurality of flutes 62 defines second flute peaks 68 and second flute valleys 69 extending between the first face 20 and the second face 30 of the media pack 15 (FIG. 1). The second flute peaks 68 and the second flute valleys 69 protrude from opposite sides of the second sheet of filtration media 60.

In various embodiments, each flute in the second plurality of flutes 62 is parallel to the remainder of flutes in the second plurality of flutes 62. The flutes in the second plurality of flutes 62 are curved between the first face 20 and the second face 30 of the media pack 15. The curves can be consistent with configurations described above with reference; FIG. 2. In some embodiments the curvature pitch of the second plurality of flutes 62 will be equal to the curvature pitch of the first plurality of flutes 52 but in the opposite direction of the first plurality of flutes 52.

Figure 4:
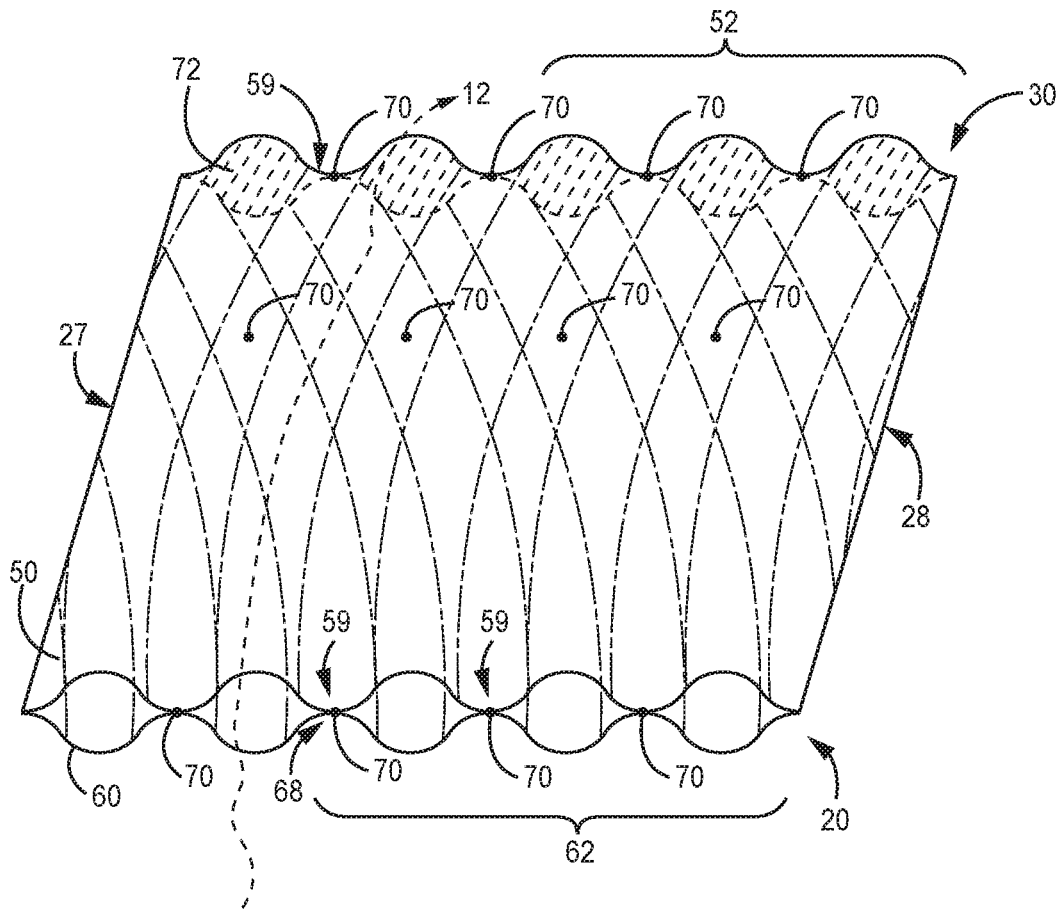
FIG. 4 is a perspective view of the first and second sheets of filtration media of FIG. 2 and FIG. 3 stacked with the first media sheet on top of the second media sheet, and the second media sheet shown partially in dashed lines.

The flutes defined in the sheets of filtration media described herein can be configured to define fluid flow pathways through a filtration media pack. To construct a filtration media pack, alternating first sheets of filtration media 50 and second sheets of filtration media 60, for example, are layered such as shown in FIG. 4, which depicts two layers. Specifically, FIG. 4 is a perspective view of a media pack where the first sheet of filtration media 50 of FIG. 2 is stacked on the second sheet of filtration media 60 of FIG. 3. The curvature of the flutes on the second sheet of filtration media 60 is depicted through the first sheet of filtration media 50 for clarity.

The first plurality of flutes 52 of the first sheet of filtration media 50 are non-parallel to the second plurality of flutes 62 of the second sheet of filtration media 60. The first plurality of flutes 52 form first curves and the second plurality of flutes 63 form second curves. In some embodiments the curvature pitch of the first curves is opposite the curvature pitch of the second curves. The first sheet of filtration media 50 contacts the second sheet of filtration media 60 at a discrete point 70. Generally, each first flute valley 59 contacts one second flute peak 68 at a discrete point 70. In some embodiments, at least one first flute valley 59 contacts one second flute peak 68 at two discrete points 70. In some examples, at least one first flute valley contacts two second flute peaks. In some embodiments, at least one first flute valley contacts three second flute peaks. In some embodiments, at least one first flute valley contacts four second flute peaks. In some embodiments, at least one first flute valley contacts four second flute peaks but less than ten second flute peaks.

In various embodiments the first media sheet 50 and the second media sheet 60 are secured along a third edge 27 and a fourth edge 28, corresponding to a third side 36 and a fourth side 38 of the filter element depicted in FIG. 1. The first sheet of filtration media 50 and the second sheet of filtration media 60 can be secured with an adhesive, such as a bead of glue or through other approaches, which obstructs fluid from passing between the third edge and fourth edge of the media pack.

The first plurality of flutes 52 and second plurality of flutes 62 cumulatively define, as an example, an upstream portion of the fluid pathway 12 between the first media sheet 50 and the second media sheet 60 from the first face 20 towards the second face 30 of the media pack. An obstruction 72 is disposed between the first media sheet 50 and the second media sheet 60 such that the upstream portion of the fluid pathway 12 is obstructed towards the second face 30 of the media pack so that fluid flowing into the upstream portion of the fluid pathway (the "inlet") through the first face 20 passes through the first sheet of filtration media 50 and/or the second sheet of filtration media 60 to exit the media pack 15 through a downstream portion of the fluid pathway 12. As such, the first sheet of filtration media 50 and the second sheet of filtration media 60 are arranged in parallel along the fluid pathway 12 rather than in a series. Similarly, the downstream portion of the fluid pathway 12 (not shown) has an obstruction towards the first face 20 of the media pack between the first sheet of filtration media and the second sheet of filtration media. Where the sheets of filter media are discontinuous, such as in FIG. 4, obstructions can be constructed through depositing an adhesive, such as a glue bead between the relevant adjacent media sheets.

The filter element 10 depicted in FIG. 1 depicts an example where the pathways between alternating adjacent layers of media towards the upstream face (and towards downstream face, although not visible in the current view) have obstructions 23 so that fluids entering the first face 20 of the filtration media pack 15 pass through the filter media before exiting through the second face 30 of the media pack 15.

Figure 5:
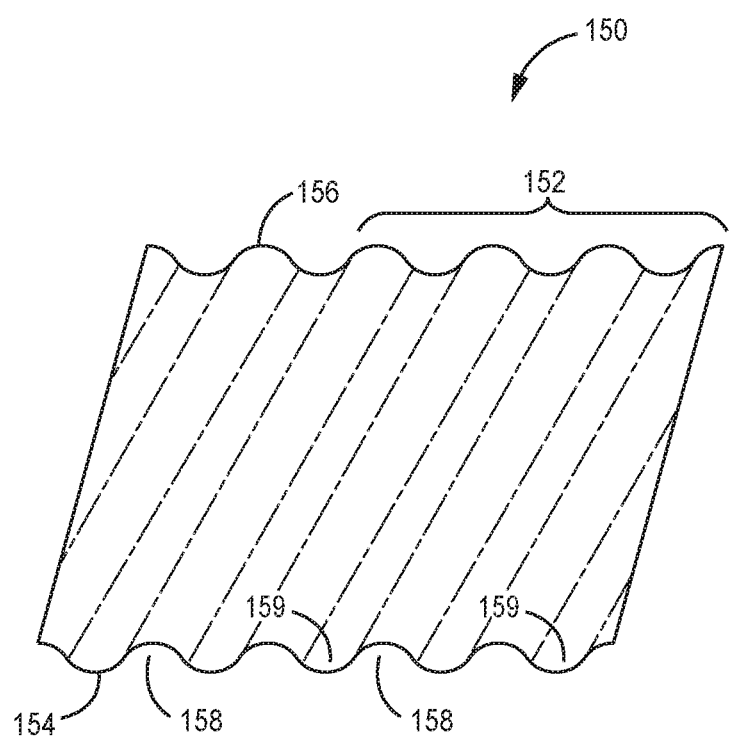
FIG. 5 is a perspective view of another example first fluted sheet of filtration media constructed and arranged in accordance with an implementation.
Figure 6:
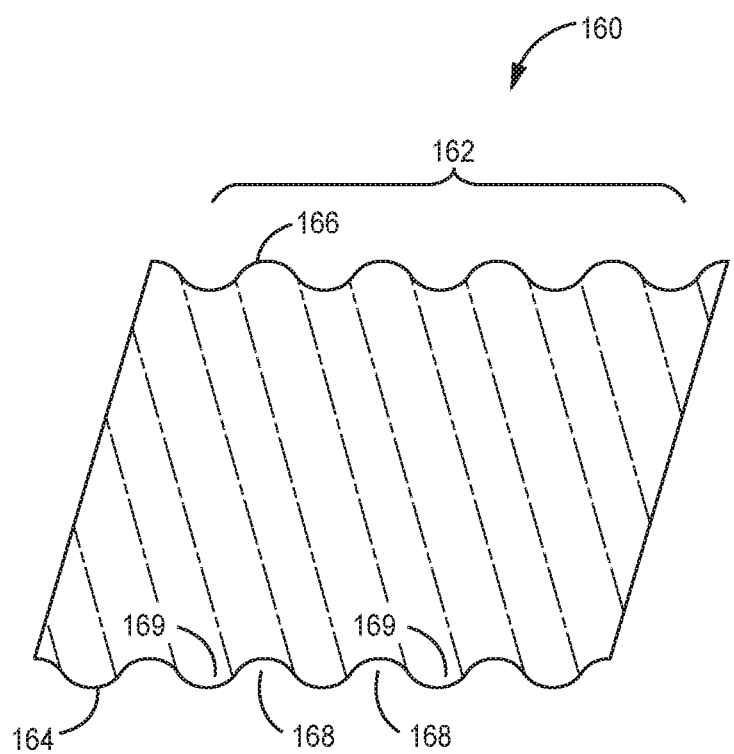
FIG. 6 is a perspective view of another example second fluted sheet of filtration media constructed and arranged in accordance with an implementation.
Figure 7:
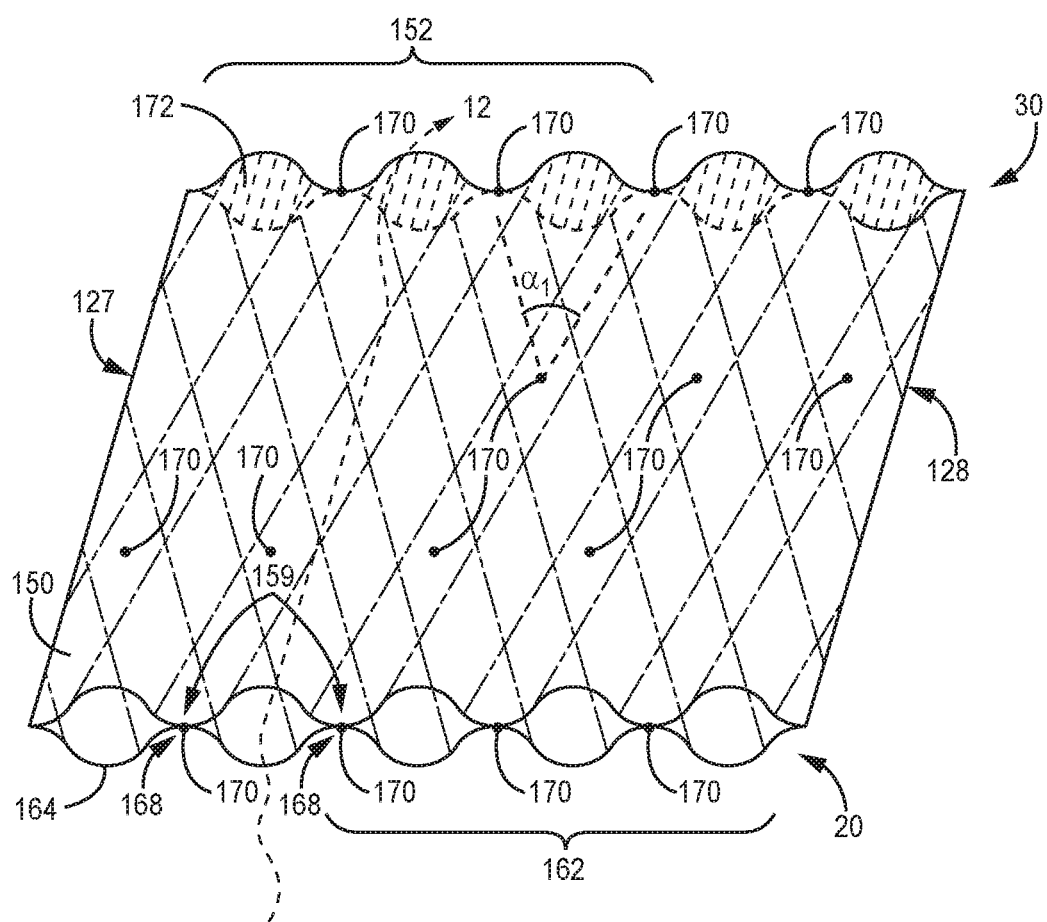
FIG. 7 is a perspective view of the third and fourth fluted media sheets of FIG. 6 and FIG. 6 stacked with the third media sheet on top of the fourth media sheet, and the fourth media sheet shown partially in dashed lines.

FIGS. 5-7 depict an alternate configuration of alternating fluted media sheets consistent with the filter element 10 of FIG. 1. Specifically, FIG. 5 is a perspective view of a first sheet of filtration media 150 constructed and arranged in accordance with some implementations. The first sheet of filtration media 150 has a first plurality of parallel flutes 152 each extending between a first edge 154 and a second edge 156 of the first media sheet 150. The first edge 154 in the depicted embodiment corresponds to the first face 20 of filter element 10 (FIG. 1), while second edge 156 corresponds to the second face 30 of the filter element 10 (FIG. 1). As such, the first plurality of flutes 152 extends between the first face 20 of the media pack and the second face 30 of the media pack 15.

The first plurality of flutes 152 defines first flute peaks 158 and first flute valleys 159 extending between the first face 20 and the second face 30 of the media pack 15 (see FIG. 1). The first flute peaks 158 and the first flute valleys 159 protrude from opposite sides of the first sheet of filtration media 150. Each flute in the first plurality of flutes 152 is parallel to the remainder of flutes in the first plurality of flutes 152.

The flutes in the first plurality of flutes 152 are substantially straight between the first face 20 and the second face 30 of the media pack of the filter element 10 (FIG. 1). Substantially straight flutes as referenced herein generally means that each of the flute peaks defines a straight line along at least 90% or 95% of their respective lengths between the first face of the media pack and the second face of the media pack, which accounts for distortions that can occur at the flute ends when constructing a media pack, including pleated media packs which are discussed further herein.

In various embodiments the flutes in the first plurality of flutes 152 are generally not perpendicular to the first face 20 of the media pack 15 and the second face 30 of the media pack 15. In some embodiments the flutes are angularly offset from the first face of the media pack and the second face of the media pack by at least 45 degrees but less than 90 degrees. In some embodiments, the flutes are angularly offset from the first face of the media pack and the second face of the media pack by 45-60 degrees, 60-75 degrees or 75-85 degrees. In some embodiments the flutes can be described as being angularly offset from the first edge 154 and the second edge 156 of the first sheet of filtration media 150. In some embodiments the flutes are angularly offset from the first edge 154 and the second edge 156 of the first sheet of filtration media 150 at least 45 degrees and less than 90 degrees. In some embodiments, the flutes are angularly offset from the first edge 154 and the second edge 156 of the first sheet of filtration media 150 by 45-60 degrees, 60-75 degrees or 75-85 degrees.

In at least some alternate embodiments the flutes in the first plurality of flutes 152 are perpendicular to the first face 20 of the media pack 15 and the second face 30 of the media pack 15 and/or the first edge 154 and the second edge 156 of the first sheet of filtration media 150.

FIG. 6 is a perspective view of a second sheet of filtration media 160. The second sheet of filtration media 160 has a second plurality of parallel flutes 162 each extending between a first edge 164 and a second edge 166 of the second sheet of filtration media 160, and therefore extending between the first face 20 and the second face 30 of the filter element 10 (FIG. 1). The second plurality of flutes 162 defines second flute peaks 168 and second flute valleys 169 extending between the first face 20 and the second face 30 of the media pack 15 (see FIG. 1). The second flute peaks 168 and the second flute valleys 169 protrude from opposite sides of the second sheet of filtration media 160. Each flute in the second plurality of flutes 162 is parallel to the remainder of flutes in the second plurality of flutes 162.

The flutes in the second plurality of flutes 162 are substantially straight between the first face 20 and the second face 30 of the media pack 15 of the filter element 10 (FIG. 1). The flutes in the second plurality of flutes 162 are not perpendicular to the first face 20 of the media pack 15 and the second face 30 of the media pack 15. The second plurality of flutes 162 can be angularly offset from the first face of the media pack and the second face of the media pack, and/or the first edge 164 and a second edge 166 of the second sheet of filtration media 160 by similar ranges discussed above with reference to FIG. 5.

The first plurality of flutes and the second plurality of flutes defined in the sheets of filtration media described herein can be configured to define fluid flow pathways through a filtration media pack. To construct a filtration media pack, alternating first sheets of filtration media 150 and second sheets of filtration media 160, for example, are layered such as shown in FIG. 7, which depicts two layers. Specifically, FIG. 7 is a perspective view of a media pack where the first sheet of filtration sheet 150 of FIG. 5 is stacked on the second sheet of filtration media 160 of FIG. 6. The extension of the flutes on the second sheet of filtration media 160 is depicted through the first sheet of filtration media 150 for clarity.

The first plurality of flutes 152 of the first sheet of filtration media 150 are non-parallel to the second plurality of flutes 162 of the second sheet of filtration media 160. The first sheet of filtration media 150 generally contacts the second sheet of filtration media 160 at a discrete contact point 170. The first plurality of flutes 152 is angularly offset relative to the second plurality of flutes 162 by at least 5 degrees, where the offset angle $\alpha_1$ can be measured between a valley 159 of the first sheet of filtration media 150 and a peak 168 of the second sheet of filtration media 160 at their respective contact point 170. In some embodiments, the first plurality of flutes 152 is angularly offset relative to the second plurality of flutes 162 between 5 and 15 degrees. In some embodiments, the first plurality flutes 152 is angularly offset relative to the second plurality of flutes 162 by at least 10 degrees. In some embodiments, the first plurality of flutes 152 is angularly offset relative to the second plurality of flutes 162 between 15 and 30 degrees. In some embodiments, the first plurality of flutes 152 is angularly offset relative to the second plurality of flutes 162 by at least 20 degrees. The first plurality of flutes 152 is angularly offset relative to the second plurality of flutes 162 by less than 40 degrees in some constructions.

Generally, each first flute valley 159 contacts one second flute peak 168 at a discrete contact point 170. In some examples, at least one first flute valley 159 contacts two second flute peaks 168. In some embodiments, at least one first flute valley contacts three second flute peaks. In some embodiments, at least one first flute valley contacts four second flute peaks. In some embodiments, at least one first flute valley contacts four second flute peaks but less than ten second flute peaks.

In various embodiments the first media sheet 150 and the second media sheet 160 are secured along a third edge 127 and a fourth edge 128, corresponding a the third side 36 and a fourth side 38 of the filter element 10 depicted in FIG. 1. The first sheet of filtration media 150 and the second sheet of filtration media 160 can be secured with an adhesive, such as a bead of glue or through other approaches, which obstructs fluid from passing between the third edge 127 and fourth edge 128 of the media pack.

The first plurality of flutes 152 and second plurality of flutes 162 cumulatively define, as an example, an upstream portion of the fluid pathway 12 between the first media sheet 150 and the second media sheet 160 from the first face 20 towards the second face 30 of the media pack. An obstruction 172 is disposed between the first media sheet 150 and the second media sheet 160 such that the upstream portion of the fluid pathway 12 is obstructed towards the second face 30 of the media pack such that fluid flowing into the upstream portion of the fluid pathway 12 (the "inlet") through the first face 20 passes through the first sheet of filter media 150 and/or the second sheet of filter media 160 to exit the media pack through a downstream portion of the fluid pathway 12. Similarly, as is visible in the embodiment depicted in FIG. 1 and previously described, an obstruction 23 is disposed between the first media sheet 16 and the second media sheet 17 such that the downstream portion of the fluid pathway 12 is obstructed towards the first face 20 of the media pack 100.

Figure 8:
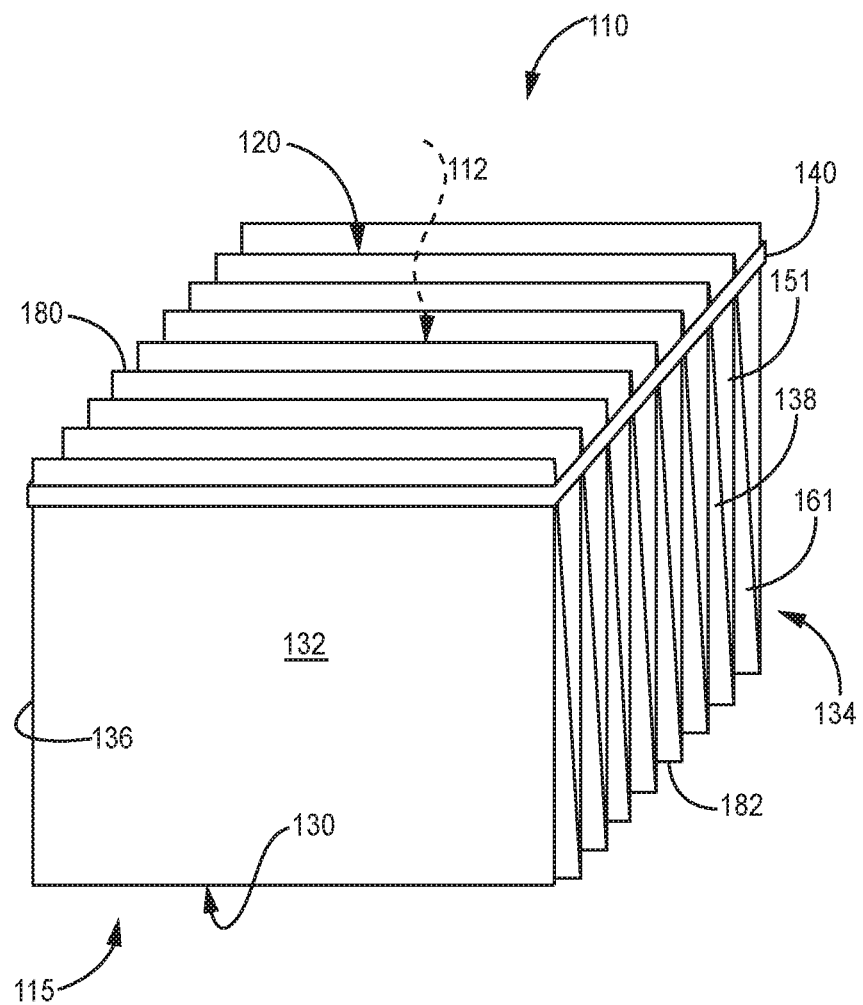
FIG. 8 is a perspective view of another example filter element consistent with the technology disclosed herein.

FIG. 8 is another example filter element 110 consistent with the technology disclosed herein. The filter elements 110 has a filtration media pack 115 and a seal member 140 extending around the periphery of the media pack 115. The filtration media pack 115 has a first face 120, a second face 130, and four side faces 132, 134, 136, 138. The first face 120 can be an inlet and the second face 130 can be an outlet. The filter element 110 is configured to be inserted into a housing (not shown) and fluids (such as an air stream) enter the filter element 10 at the first face 20, passes through the filtration media, and exits the filter element 110 at the second face 130 to define a fluid pathway 112.

The media pack 115 of the filter element 110 has a plurality of first sheets of filtration media 151 and second sheets of filtration media 161 that can be referred to as media pleats. However, unlike the media packs previously described, the current example media pack 115 is formed from a continuous web of filtration media, examples of which are depicted in FIGS. 9-17 and described below. In such embodiments, the first sheets of filtration media 151 and the second sheen of filtration media 161 are separated by first set of pleat folds 180 and a second set of pleat folds 182. The first set of pleat folds 180 form obstructions between the first sheet of filtration media 151 and the second sheet of filtration media 161 towards the first face 120 of the media pack such that the fluid pathway extends through the first sheet of filtration media 151 and the second sheet of filtration media 161. Similarly, the second set of pleat folds 182 form obstructions between the first sheet of filtration media 151 and the second sheet of filtration media 161 towards the second face 130 of the media pack such that the fluid pathway extends through the first sheet of filtration media 151 and the second sheet of filtration media 161.

Figure 9:
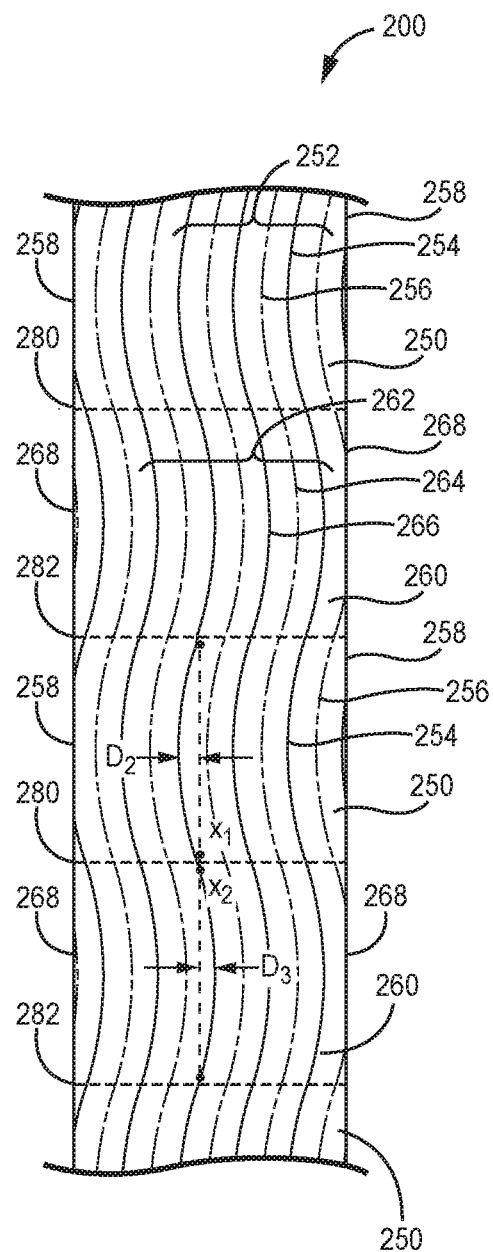
FIG. 9 is a top plan view of a web of fluted media constructed and arranged in accordance with an implementation, the web for forming a filtration media pack.

FIG. 9 depicts a continuous web of fluted media 200 constructed and arranged in accordance with some implementations, depicting the web of media 200 prior to being d into a filtration media pack. The web of media 200 will be formed into a media pack, such as that shown in FIG. 8. The embodiment shown in FIG. 9 of web of media 200 includes a plurality of alternating first filtration media sheets 250 and second filtration media sheets 260 that are separated by fold lines 280, 282 which define the locations of pleat folds. First fold lines 280 represents a first set of pleat folds and second fold lines 282 represent a second set of pleat folds, where the first set of pleat folds are configured to form a first face of a media pack and the second set of pleat folds are confirm red to form a second face of the media pack. While the fold lines 280, 282 in the current embodiment and throughout this application are depicted as straight, it should be understood that in various embodiments the fold lines deviate from a straight line to follow the flute profiles and reflect the flute peaks and valleys.

A first sheet of filtration media 250 has a first plurality of parallel flutes 252 extending between first fold lines 280 and the second fold lines 282. The first plurality of flutes 252 defines first flute peaks 254 and first flute valleys 256. In the current embodiment, which is consistent with some examples, the first plurality of flutes 252 are curved between the first fold lines 280 and the second fold lines 282. The curvature of the flutes can be measured, for example, as the distance a flute peak extends out from an axis $x_1$ joining the peaks at the ends of the flute, such as distance $D_2$ depicted in FIG. 9. The distance $D_2$ can be consistent with those described above regarding $D_1$ in FIG. 2.

A second sheet of filtration media 260 has a second plurality of parallel flutes 262 extending between first fold lines 280 and second fold lines 282. The second plurality of flutes 262 define second flute peaks 264 and second flute valleys 266. The second plurality of flutes 262 can have a curvature similar to the first plurality of flutes 252, and in some embodiments, including the one depicted, the second plurality of flutes 262 has an equal curvature as the first plurality of flutes 252 but in the opposite direction (see $D_3$ in FIG. 9).

Figure 10:
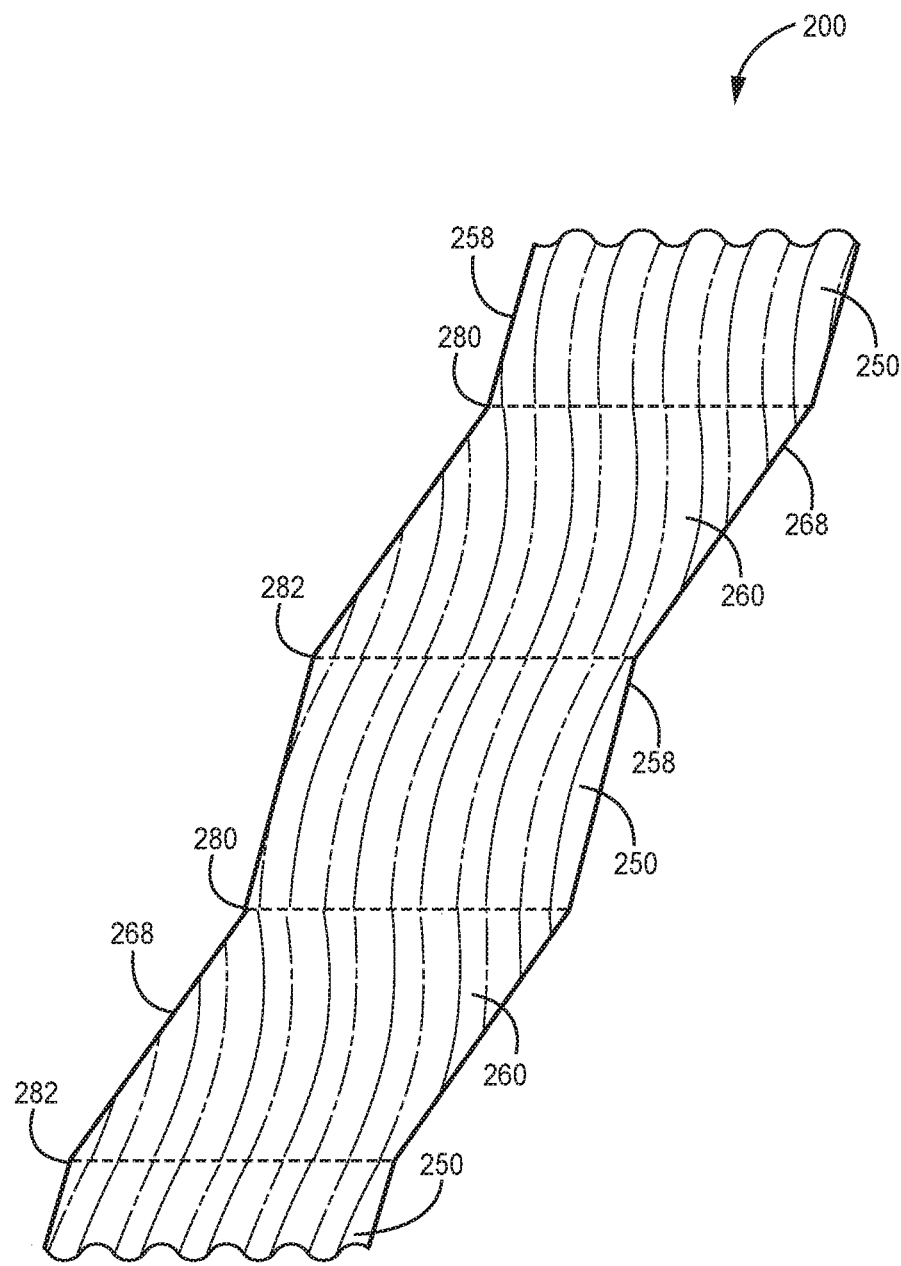
FIG. 10 is a perspective view of the web of fluted media of FIG. 9 showing the media scored and partially folded.
Figure 11:
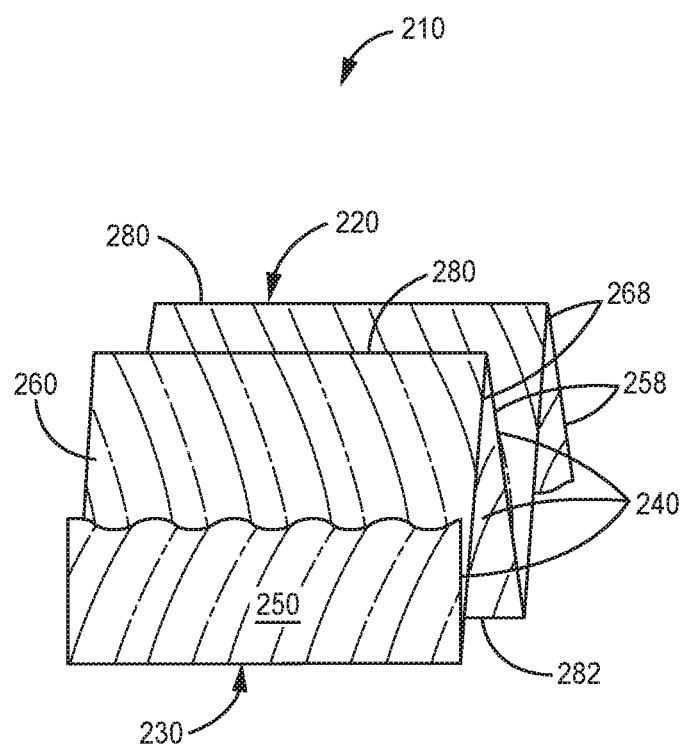
FIG. 11 is a perspective view of a portion of a filtration media pack formed using the media of FIG. 9 and FIG. 10.

The first sheets of filtration media 250 and the second sheets of filtration media 260 are folded upon one another at fold lines 280, 282 as shown in FIG. 10, which is a perspective view of the web of fluted media 200 of FIG. 9, with the web of media 200 scored and partially folded along the first fold lines 280 and the second fold lines 282. Upon further folding, as shown in FIG. 11, the media is formed into a media pack 210. A portion of a first sheet of filtration media 250 is depicted torn away from the adjacent second sheet of filtration media 260 for clarity. A first set of pleat folds 280 form an inlet face 220, a second set of pleat folds 282 form an outlet face 230, and filtration media extends between the first set of pleat folds 280 and the second set of pleat folds 282 to define a plurality of media pleats 240, where the media pleats are the first sheets of filtration media 250 and the second sheets of filtration media 260. The sheets of filtration media 250, 260 can be sealed along their pleat ends 258, 268, which refers to the edges of the sheets of filtration media 250, 260 that do not form the first set of pleat folds 280 or the second set of pleat folds 282. The plurality of flutes 252, 262 defined by each of the media pleats 240 extend between the inlet face 220 and the outlet face 230 of the media pack.

The first plurality of flutes 252 and the second plurality of flutes 262 are non-parallel to reduce contact points between the sheets of filtration media 250, 260. Generally each first flute valley 256 contacts one second flute peak at a discrete contact point. In some embodiments, at least one first flute valley 256 contacts one second flute peak 266 at two discrete points. In some examples, at least one first flute valley contacts two second flute peaks. In some embodiments, at least one first flute valley contacts three second flute peaks. In some embodiments, at least one first flute valley contacts four second flute peaks. In some embodiments, at least one first flute valley contacts four second flute peaks but less than ten second flute peaks. In some embodiments, the first plurality of flutes 252 form first curves, the second plurality of flutes 262 form second curves, and the first curves have a curvature pitch that is the opposite of the curvature pitch of the second curves.

Figure 12:
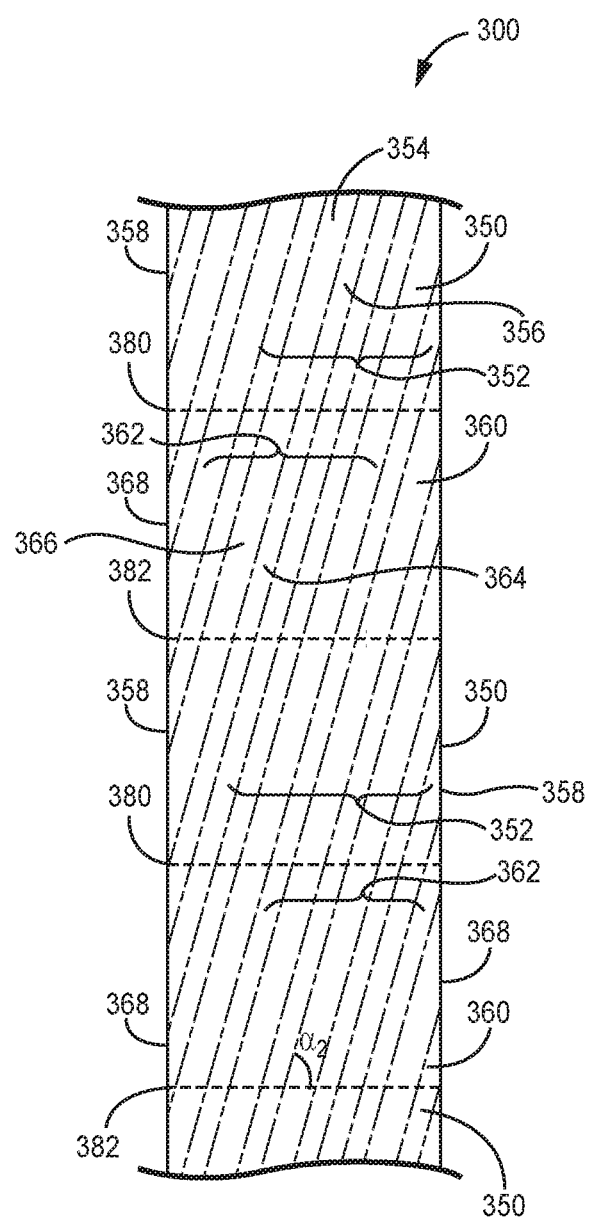
FIG. 12 is a top plan view of a web of fluted media constructed and arranged in accordance with an implementation, the web for forming a filtration media pack.
Figure 13:
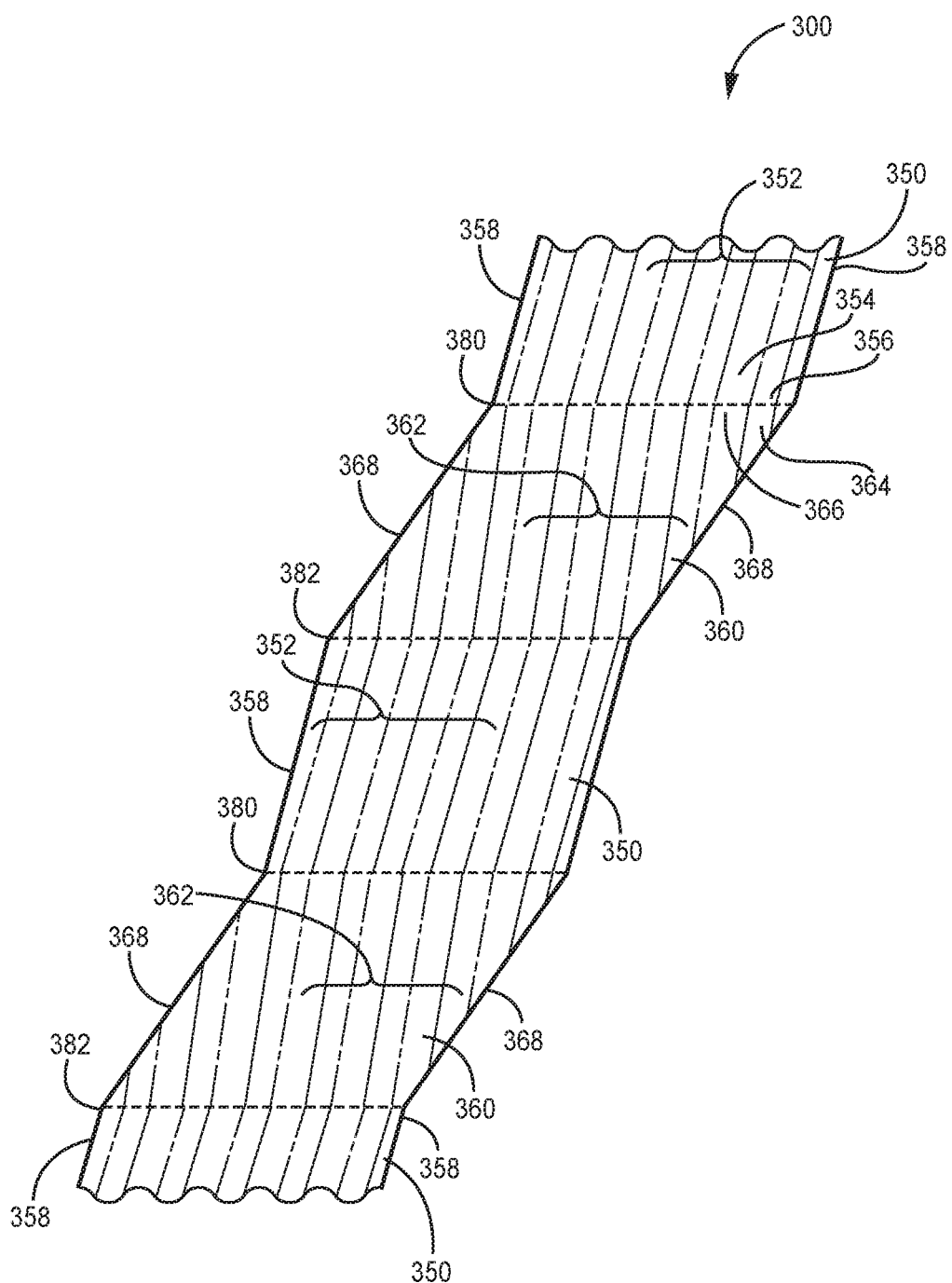
FIG. 13 is a perspective view of the web of fluted media of FIG. 12, constructed and arranged in accordance with an implementation, showing the media scored and partially folded.
Figure 14:
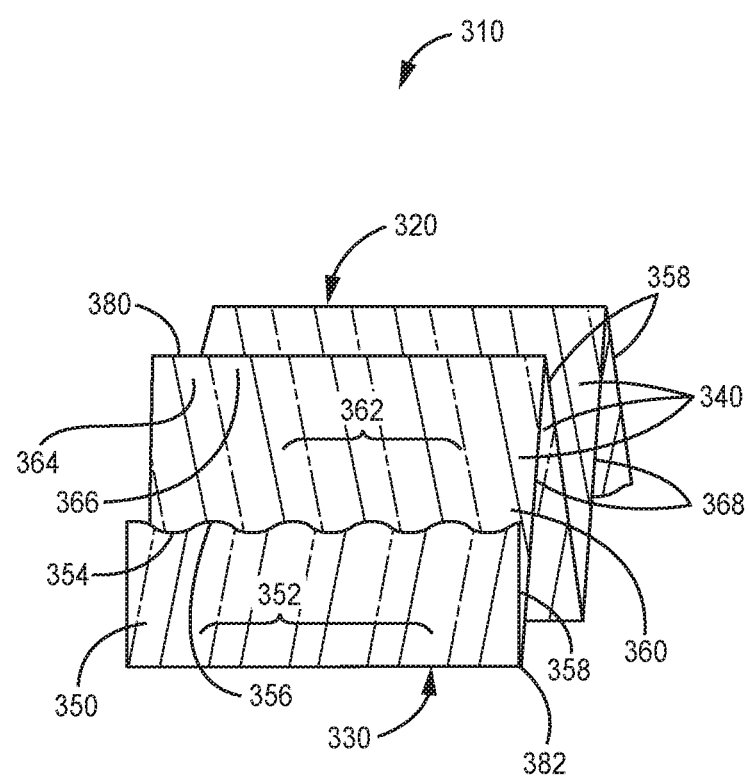
FIG. 14 is a perspective view of a portion of a filtration media pack formed using the media of FIG. 12 and FIG. 13.

FIG. 12 is a top plan view of another example web 300 of fluted media constructed and arranged in accordance with some implementations, prior to being formed into a filtration media pack. FIG. 13 depicts the web 300 of fluted media scored and partially folded, and FIG. 14 depicts the web 300 folded into a media pack 310. The media pack 310 can be incorporated in a filtration element, such as that shown in FIG. 8. The web 300, and therefore the media pack 310, has alternating first sheets of filtration media 350 and a second sheets of filtration media 360 separated by fold lines 380, 382. A first sheet of filtration media 350 and the second sheet of filtration media 360 are continuous relative to each other and separated by a fold 380.

The first sheet of filtration media 350 has a first plurality of parallel flutes 352 defining first flute peaks 354 and first flute valleys 356 extending between a first face 320 of the media pack 310 and the second face 330 of the media pack 310. The second sheet of filtration media 360 has a second plurality of parallel flutes 362 defining second flute peaks 364 and second flute valleys 366 extending between a first face 320 of the media pack 310 and the second face 330 of the media pack 310. The first sheet of filtration media 350 has first pleat ends 358 and the second sheet of filtration media 360 has second pleat ends 368, where the first pleat ends 358 and the second pleat ends 368 can be sealed. The first plurality of flutes 352 and the second plurality of flutes 362 are substantially straight.

In some embodiments, the flutes in the first plurality of flutes 352 are generally not perpendicular to the first face 320 of the media pack 310 and the second face 330 of the media pack 310, although in some other embodiments the flutes in the first plurality of flutes 352 are perpendicular to the first face 320 of the media pack 310 and the second face 330 of the media pack 310. The flutes in the second plurality of flutes 362 are generally not perpendicular to the first face 320 of the media pack 310 and the second face 330 of the media pack 310.

Additionally or alternatively, the flute angle (see angle $\alpha_2$, in FIG. 12, for example) can be measured between a flute peak 344 and a fold line 382, disregarding the ends of the flutes to the extent there are flute distortions resulting from folding the media along fold lines 380, 382. The respective flute angles of the first sheet 350 and second sheet 360 relative to a first fold line 380 and a second fold line 38:2 can have the same angle ranges as discussed above with reference to FIG. 5 between the flutes and the first edge 154 and second edge 156 of the sheet of filtration media.

The first plurality of flutes 352 and the second plurality of flutes 362 are non-parallel. The first plurality of flutes 352 and the second plurality of flutes 362 can be angularly offset as described above with reference to FIG. 7.

The offset flute orientations result in flutes which contact one another at a flute peak and an adjacent flute valley. For example, generally each first flute valley 356 contacts one second flute peak 364 at a discrete contact point. Generally, each first flute valley 356 contacts one second flute peak 364 at a discrete point 370. In some examples, at least one first flute valley 356 contacts two second flute peaks 364. In some embodiments, at least one first flute valley contacts three second flute peaks. In some embodiments, at least one first flute valley contacts four second flute peaks. In some embodiments, at least one first flute valley contacts four second flute peaks but less than ten second flute peaks.

Figure 15:
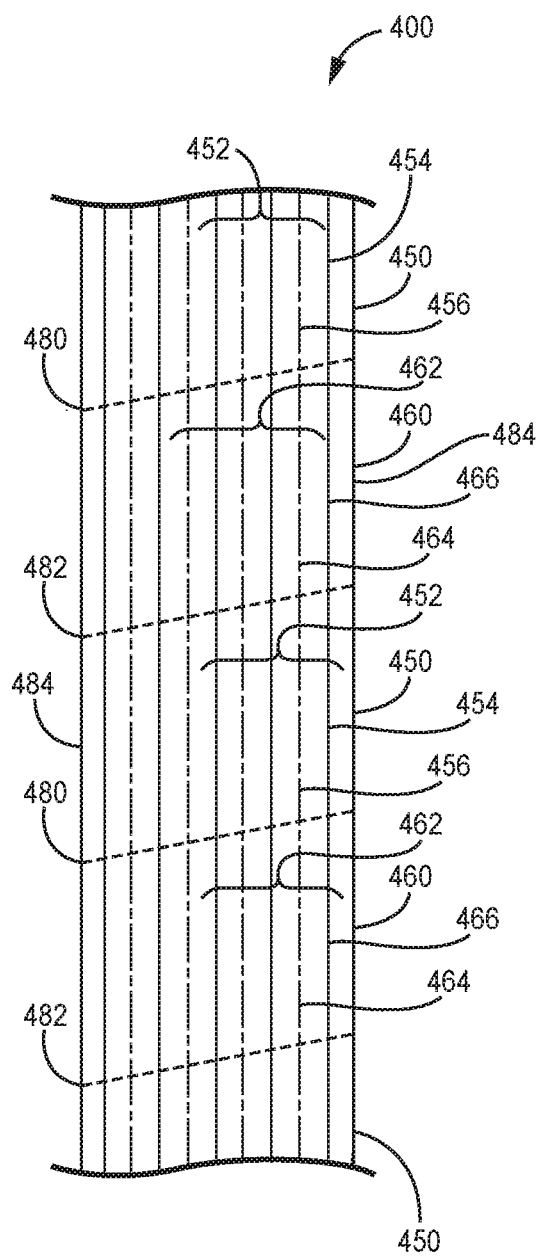
FIG. 15 is a top plan view of a web of fluted media constructed and arranged in accordance with various implementations, the web for forming a filtration media pack.
Figure 16:
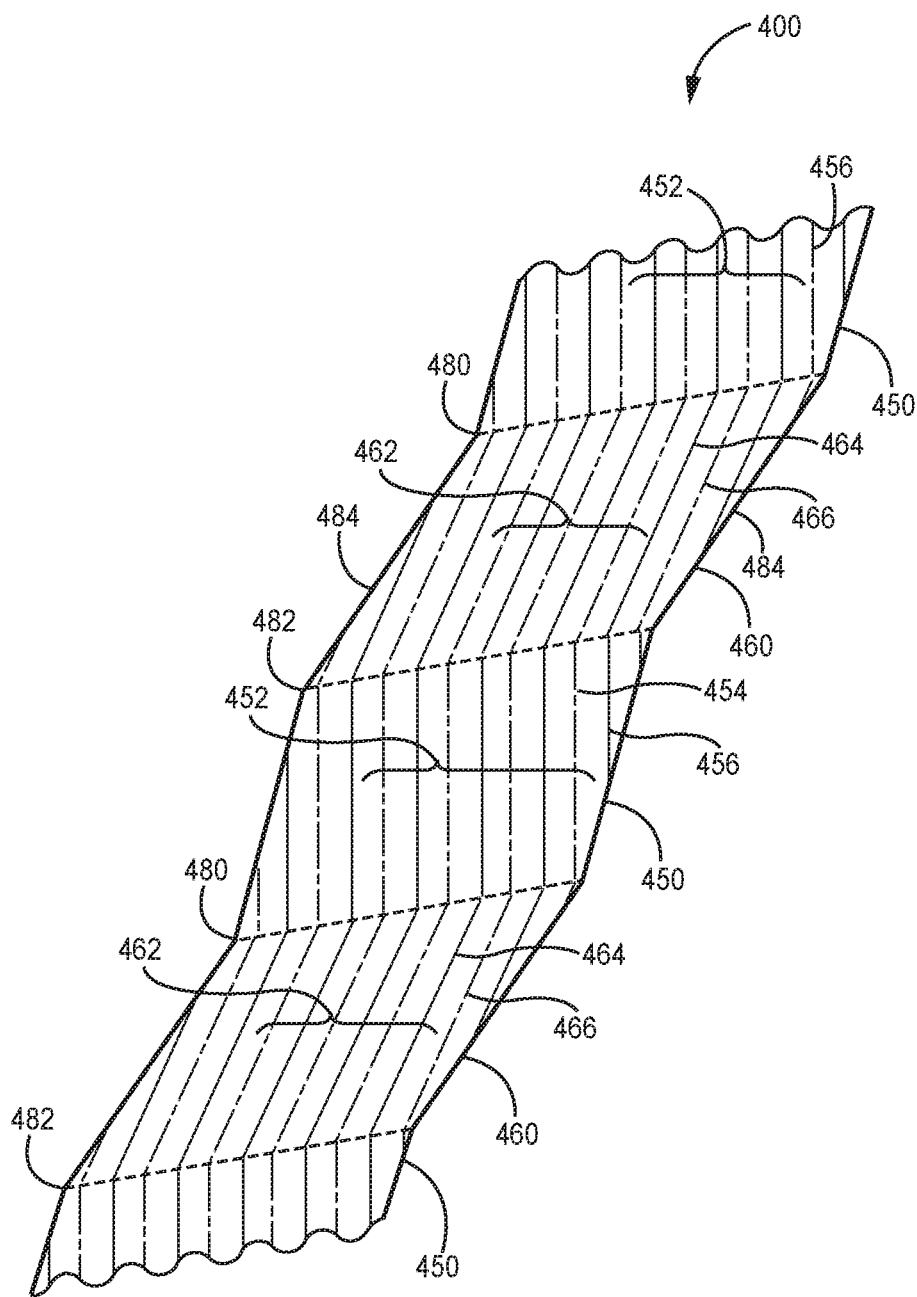
FIG. 16 is a perspective view of the web of fluted media of FIG. 15, constructed and arranged in accordance with various implementations, showing the media scored and partially folded.

FIG. 15 is a top plan view of a web of fluted media 400 constructed and arranged in accordance with an implementation. The web of media 400 is configured to be formed into a pleated filtration media pack 410 depicted in FIG. 17. FIG. 16 depicts the web of media 400 partially folded along fold lines 480, 482. The web of media 400, and therefore the media pack 410, has alternating first sheets of filtration media 450 and a second sheets of filtration media 460 separated by fold lines 480, 482. The fold lines 480, 482 are rotated slightly relative to the cross-web direction such that they are not perpendicular to the pleat ends 484 of the web of media 400.

The first sheet of filtration media 450 has a first plurality of parallel flutes 452 defining first flute peaks 454 and first flute valleys 456 extending between a first face 420 of the pleated filtration media pack 410 and the second face 430 of the pleated filtration media pack 410. The second sheet of filtration media 460 has a second plurality of parallel flutes 462 defining second flute peaks 464 and second flute valleys 466 extending between a first face 420 of the media pack 410 and the second face 430 of the media pack 410. The first plurality of flutes 452 and the second plurality of flutes 462 are substantially straight.

The flutes in the first plurality of flutes 452 are generally not perpendicular to the first face 420 of the media pack 410 and the second face 430 of the media pack 410, where the first face of the media pack 410 and the second face 430 of the media pack 410 are defined by first pleat folds 480 and second pleat folds 482, respectively. The flutes in the second plurality of flutes 462 are generally not perpendicular to the first face 420 of the media pack 410 and the second face 430 of the media pack 410. The first plurality of flutes 452 and the second plurality of flutes 462 are non-parallel in the media pack 410, although they are parallel on the web of filtration media 400. The first plurality of flutes 452 and the second plurality of flutes can be angularly offset as described above with reference to FIG. 7.

The offset flute orientations result in flutes which contact one another in adjacent media pleats only at a flute peak and an adjacent flute valley. For example, generally each first flute valley 456 contacts one second flute peak 464 at a discrete contact point. Generally, each first flute valley 458 contacts one second flute peak 468 at a discrete point 470. In some at least one first flute valley 456 contacts two second flute peaks 464. In some embodiments, at least one first flute valley contacts three second flute peaks. In some embodiments, at least one first flute valley contacts four second flute peaks. In some embodiments, at least one first flute valley contacts four second flute peaks but less than ten second flute peaks.

Figure 17:
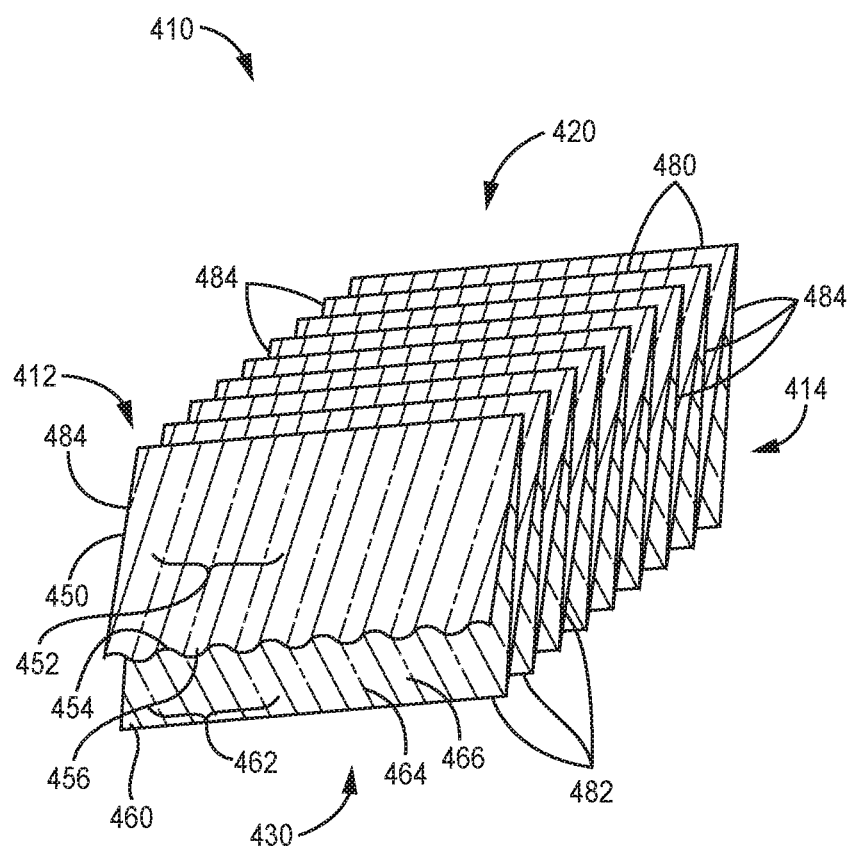
FIG. 17 is a perspective view of a portion of a filtration media pack formed using the media of FIG. 15 and FIG. 16.

The media pack 410 of FIG. 17 has filtration media extends between the fold lines 480 in a back and forth arrangement of pleated media to define a plurality of media pleats. A plurality of flutes are defined by each of the media pleats, with the flutes having a length from one end of the flute to the opposite end of the flute, which extends between the inlet face 420 and outlet face 430 of the media pack 410. Pleat ends 484 of the filtration media extend from the face 420 of the media pack to the outlet face of the media pack forming a first side face 412 and second side face 414. The first side face 412 and second side face 414 are opposite from one another. The inlet face 420 is substantially parallel with the outlet face 430, while the first side face 412 is substantially parallel with the second side face 414; and wherein the first side face 412 intersects the inlet face 420 at an angle of fess than 90°. Thus, in this configuration each pleat of the media pack 410 defines the shape of a parallelogram.

Figure 18:
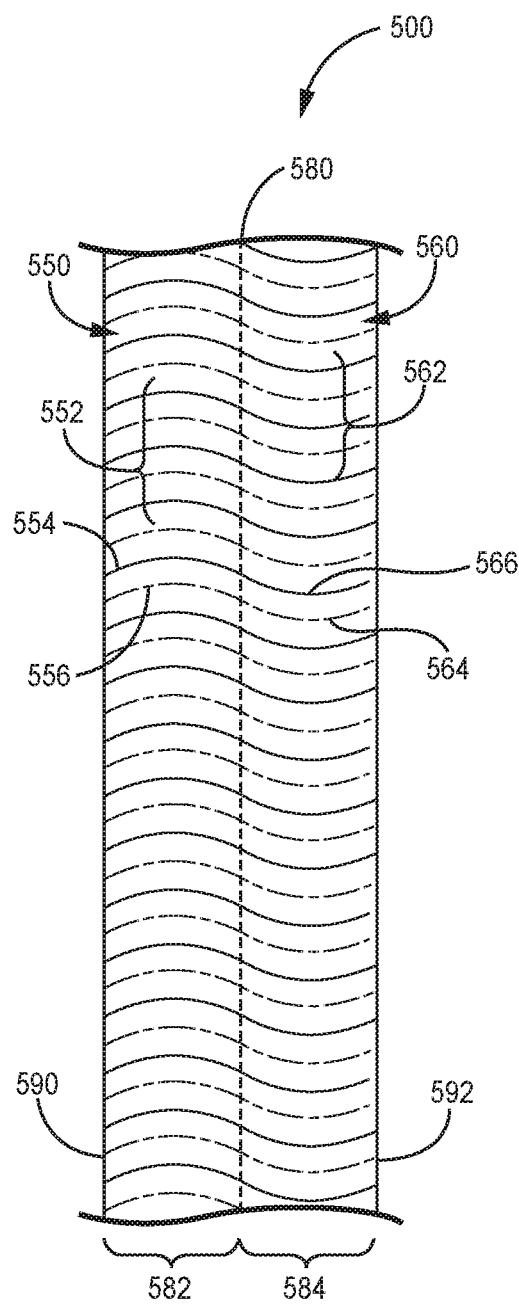
FIG. 18 is a top plan view of a web of fluted media constructed and arranged in accordance with various implementations, the web for forming a filtration media pack.
Figure 19:
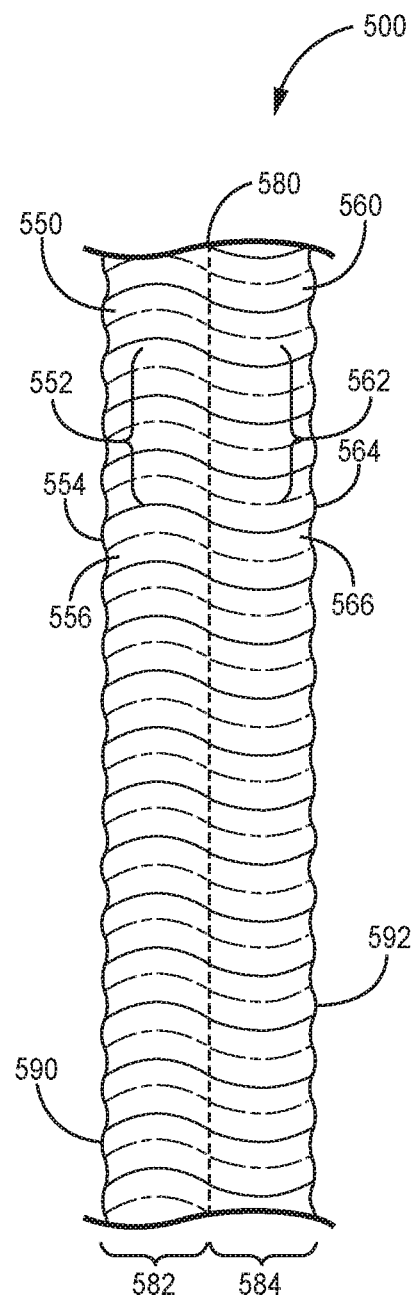
FIG. 19 is a perspective view of the web of fluted media of FIG. 18, constructed and arranged in accordance with various implementations, showing the media scored and partially folded.

FIG. 18 is a top plan view of a web of fluted media 500 constructed and arranged in accordance with some implementations. FIG. 19 is a perspective view of the web of fluted media 500 of FIG. 18 in a scored and partially folded arrangement. FIG. 20 is a perspective view of the web of fluted media 500 in a folded arrangement, and FIG. 21 is a perspective view of a filter element 510 formed using the media of FIGS. 18 and 19, where the media web 500 is folded along fold line 580 and rolled into a cylindrical media pack 515 for a filter element 510, with media edges 590, 592 defining a first face 520 of the filter element 510 and the pleat fold 580 defining a second face 530 of the filter element 510. In the rolled cylindrical filter element 510, the media has a wound cross-section.

The filtration media web 500 has a first sheet of filtration media 550 and a second sheet of filtration media 560 and a central fold line 580. As such, the first sheet of filtration media 550 and the second sheet of filtration media 560 are continuous and separated by a fold 580. The first sheet of filtration media 550 can define a first pleat 582 and the second sheet of filtration media 560 can define a second pleat 584. The fold 580 forms an obstruction between the first sheet of media 550 and the second sheet of filter media 560 to define a fluid pathway 512 extending between the first sheet of filtration media 550 and the second sheet of filtration media 560 and through the first sheet of filtration media 550 and the second sheet of filtration media 560 in parallel. While in FIG. 20 the fluid pathway 512 is depicted as passing through the first sheet of filtration media 550, the fluid pathway 512 also extends through the second sheet of filtration media 560. An obstruction 572 seals the gaps between the outer surface of the first sheet of filtration media 550 and the outer surface of the second sheet of filtration media 560 similarly such that fluids passing through the first face 520 and second face 530 of the filter element 510 must first pass through the filtration media 515, which includes the first sheet of filtration media 550 and the second sheet of filtration media 560. The obstruction 572 can be positioned towards the first flow face 520 in some embodiments. An obstruction can also be disposed in any other gaps in the filter media to prevent fluid flow there-through, such as around the outer perimeter of the media pack and in a central opening of the wound media pack 510.

The first sheet of filtration media 550 has a first plurality of parallel flutes 552 defining first flute peaks 554 and first flute valleys 556 extending between the first face 520 of the media pack 515 and a second face 530 of the media pack 515. The second sheet of filtration media 560 has a second plurality of parallel flutes 562 defining second flute peaks 564 and second flute valleys 566 extending between the first face 520 of the media pack 515 and a second face 530 of the media pack 515. The first plurality of flutes 552 are non-parallel to the second plurality of flutes 562. Each first flute valley 556 generally contacts one second flute peak 564 at a discrete contact point, and each flute valley 556 can contact additional second flute peaks 564 and possibly additional discrete contact points on particular second flute peaks 564 as has been described earlier in this application.

In the current example the first plurality of flutes 552 and the second plurality of flutes 562 are each curved. In such embodiments, the curvature of the respective curves can be consistent with curvatures described above with reference to FIGS. 2-4 and 9-11. In some alternate embodiments, the first plurality of flutes 552 and the second plurality of flutes 562 are substantially straight. In some such embodiments neither the first plurality of flutes nor the second plurality of flutes are perpendicular to the first face and the second face of the media pack. In embodiments where the first plurality flutes 552 and the second plurality of flutes 562 are substantially straight, the first plurality of flutes 552 can be angularly offset from the second plurality of flutes 562 consistently with embodiments described above with reference to FIGS. 7 and 12-14.

While the first sheet of filtration media 550 and the second sheet of filtration media 560 are continuous and separated by a fold 580 in the current embodiment, in some other embodiments having a similarly cylindrical filter element construction the first sheet of filtration media 550 and the second sheet of filtration media 560 are discontinuous and joined together by an adhesive, for example.

In embodiments depicted herein, the first sheet of filtration media and the second sheet of filtration media both define either straight or curved flutes. However, will be appreciated that, in some embodiments, the first sheet of filtration media defines straight flutes consistently with the descriptions of straight flutes herein, anti the second sheet of filtration media defines curved flutes consistently with the descriptions of curved flutes herein.

The performance of the filtration media pack can be altered or modified by selecting several design criteria. The term "performance" generally refers to at least one of increased longevity, increased loading capacity, decreased pressure drop, increased flow, decreased size or volume, etc. For example, the filtration media pack can be designed for a particular application to provide enhanced performance compared with certain presently available filtration media packs. Enhancing performance can result from, for example, controlling one or more of masking, flute width height ratio, flute length, flute density, flute shape, flute taper, and flute volume asymmetry. Any of these techniques can be used alone or in combination to provide a filtration media pack having desired properties.

The fluid that can be filtered by the filtration media pack includes gaseous substance and liquid substances. Exemplary gaseous substances that can be filtered includes air. Exemplary liquid substances that can be filtered include water, oil, fuel, and hydraulic fluid. An example type of fluid to be filtered by the filtration media pack includes air. It should be understood, however, that the filtration media pack can be used to filter other gaseous substances and other liquid substances.

In some embodiments the flutes contemplated by the technology disclosed herein can be tapered along their length. In general, a taper refers to a reduction or an increase in the size of the flute along a length of the flute. In general, filtration media that is tapered can exhibit a first set of flutes that decrease in size from a first end of the media to a second end of the media, and a second set of flutes that increase in size from the first end of the media to the second end of the media. Some filtration media can contain regions that are considered non-tapered and regions that are considered tapered along the flute length.

In some instances, each of the inlet and outlet can be generally planar, with the two parallel to one another. However, variations from this, for example non-planar faces, are possible in some applications. Furthermore, the characterization of an flow face and an opposite exit flow face is not a requirement that the inlet flow face and the outlet flow face are parallel. The inlet flow face and the exit flow face can, if desired, be provided as parallel to each other. Alternatively, the inlet flow face and the outlet flow face can be provided at an angle relative to each other so that the faces are not parallel. In addition, non-planar faces can be considered non-parallel faces.

In general, the reference to a pressure drop across the media refers to the pressure differential determined at a first face of the media relative to the pressure measured at second face of the media, wherein the first face and the second face are provided at generally opposite ends of a flute.

In order to provide a filtration media having a relatively high flute density while retaining a desired pressure drop, the flute length can be decreased. The flute length refers to the distance from the first ace of the filtration media to the second face of the filtration media. In certain implementations, the flute length is greater than 0.375 inches alternatively greater than 0.5 inches, greater than 1 inches, or greater than 2 inches. Example configurations have flute lengths of greater than 3, greater than 4, or greater than 6 inches. Optionally the flute lengths are greater than 8, 10, or 12 inches. In some constructions the flute lengths are less than 12, less than 10, less than 8, less than 6, less than 4, or less than 2 inches.

In some embodiments the filtration media pack exhibits a flute density of at least 35.0 flute/inch$^2$ according to the formula:

$$\text{Flute Density} = \frac{\text{number of flute peaks}}{2 \times \text{area of an inlet face or outlet face of the media pack}}$$

In some embodiments the filtration media pack exhibits a flute 3-70 flutes/inch$^2$. In some embodiments filtration media pack has a flute density of 4-10 flutes/inch$^2$ or 20-60 flutes/inch$^2$. In some embodiments filtration media pack has a flute density of 30-50 flutes/inch$^2$. In some embodiments filtration media pack has a flute density of less than 70 flutes/inch$^2$.

Some embodiments of the current technology can have flute volume asymmetry. Flute volume asymmetry refers to a volumetric difference within a filter element between the upstream volume and the downstream volume. The upstream volume refers to the volume between the sheets of filtration media that receives the unfiltered fluid, and the downstream volume refers to the volume between the sheets of filtration media that receives the filtered fluid that has passed through the filtration media from the upstream side. It can be desirable to provide a filtration element having an upstream volume that is greater than the downstream volume in some embodiments. It has been observed that in the case of filtering air particulates in the air are deposited on the upstream side and, as a result, the capacity of the filtration media can be related to the volume of the upstream side. In some implementations, by providing volume asymmetry, it is possible to increase the volume available for receiving the incoming fluid and thereby increase the capacity of the media pack.

Filtration media having a flute volume asymmetry exists when the difference between the upstream volume and the downstream volume is greater than 10%. Optionally, media exhibiting flute volume asymmetry has flute volume asymmetry of greater than about 10%, greater than about 20%, greater than 30%, and preferably greater than about 50%. Exemplary ranges for flute volume asymmetry include about 30% to about 250%, and about 50% to about 200%.

Filtration media having flute volume asymmetry can result from the presence of regular flutes or tapered flutes.

Furthermore, media having relatively symmetric tapered flutes (e.g., flutes tapering in each direction to relatively the same extent), can provide media lacking flute volume asymmetry (less than 10% volume asymmetry). Accordingly, the existence or non-existence of tapered flutes does not imply or mean that existence or non-existence of an asymmetric volume arrangement. Media having a regular flute arrangement (e.g., non-tapered) may or may not exhibit an asymmetric volume arrangement.

Filtration media described herein can be constructed of various types of fibers and combinations of fibers. In some embodiments the filtration media has one or more of cellulose fibers, glass fibers, and polymeric fibers. The media can contain a resin. During the flute formation process, the media can be heated to above the glass transition point of the resin. When the resin cools, it will help to maintain the fluted shapes.

The media can be provided with a fine fiber material on one or both sides thereof, for in accord with U.S. Pat. Nos. 6,955,775, 6,673,136, and 7,270,693, incorporated herein by reference. In general, fine fiber can be referred to as polymer fine fiber (microfiber and nanofiber) and can be provided on the media to improve filtration performance. As a result of the presence of fine fiber on the media, it may be possible or desirable to provide media having a reduced weight or thickness while obtaining desired filtration properties. Accordingly, the presence of fine fiber on media can provide enhanced filtration properties, provide for the use of thinner media, or both. Fiber characterized as fine fiber can have a diameter of about 0.001 micron to about 10 microns, about 0.005 micron to about 5 microns, or about 0.01 micron to about 0.5 micron. Nanofiber refers to a fiber having a diameter of less than 200 nanometer or 0.2 micron. Microfiber ca refer to fiber having a diameter larger than 0.2 micron, but not larger than 10 microns. Exemplary materials that can be used to forth the fine fibers include polyvinylidene chloride, polyvinyl alcohol polymers and co-polymers comprising various nylons such as nylon 6, nylon 4,6, nylon 6,6, nylon 6,10, and co-polymers thereof, polyvinyl chloride, PVDC, polystyrene, polyacrylonitrile, PMMA, PVDF, polyamides, and mixtures thereof.

The above specification provides a complete description of the present invention. Since many embodiments of the invention can be made without departing from the spirit and scope of the invention, the invention resides in the claims hereinafter appended.

I claim:

1. A filtration media pack comprising:
   a first sheet of filtration media, the first sheet of filtration media comprising a first plurality of parallel flutes extending between a first edge of the first sheet of filtration media and a second edge of the first sheet of filtration media, wherein the first plurality of parallel flutes define first flute valleys extending between a first face of the filtration media pack and a second face of the filtration media pack;
   a second sheet of filtration media, the second sheet of filtration media comprising a second plurality of parallel flutes defining second flute peaks extending between the first face of the filtration media pack and the second face of the filtration media pack, wherein each first flute valley contacts one second flute peak at a discrete contact point,
   wherein the first plurality of parallel flutes are non-parallel to the second plurality of parallel flutes, wherein each of the first plurality of parallel flutes defines a curve relative to the first edge of the first sheet of filtration media and the second edge of the first sheet of filtration media; and
   an obstruction between the first sheet of filtration media and the second sheet of filtration media to define a fluid pathway extending through the first sheet of filtration media and the second sheet of filtration media in parallel.

2. The filtration media pack of claim 1, wherein at least one first flute valley contacts two second flute peaks.

3. The filtration media pack of claim 1, wherein at least one first flute valley contacts three second flute peaks.

4. The filtration media pack of claim 1, wherein at least one first flute valley contacts four second flute peaks but less than ten second flute peaks.

5. The filtration media pack of claim 1, wherein each of the first plurality of parallel flutes and the second plurality of parallel flutes are not perpendicular to the first face and the second face of the filtration media pack.

6. The filtration media pack of claim 1, wherein the first plurality of parallel flutes is offset relative to the second plurality of parallel flutes by at least 5 degrees.

7. The filtration media pack of claim 1, wherein the first plurality of parallel flutes is substantially straight.

8. The filtration media pack of claim 1, wherein the curve of a peak of a flute in the first plurality of parallel flutes extends outward from an axis joining the peak at each end of the flute by at least 5% of the flute length.

9. The filtration media pack of claim 1, wherein the curve of a peak of a flute in the first plurality of parallel flutes extends outward from an axis joining the peak at each end of the flute by at least 10% of the flute length.

10. The filtration media pack of claim 1, wherein the curve of a peak of a flute in the first plurality of parallel flutes extends outward from an axis joining the peak at each end of the flute by at least 20% of the flute length.

11. The filtration media pack of claim 1, wherein the second plurality of parallel flutes are curved.

12. The filtration media pack of claim 1, wherein the first plurality of parallel flutes form first curves, the second plurality of parallel flutes form second curves, and the first curves have a curvature pitch that is opposite the curvature pitch of the second curves.

13. The filtration media pack of claim 1, wherein the first sheet of filtration media and the second sheet of filtration media are continuous and separated by a fold.

14. The filtration media pack of claim 1, wherein the first sheet of filtration media and the second sheet of filtration media define a cylindrical media pack with a wound cross-section.

15. The filtration media pack of claim 1, wherein the first sheet of filtration media and the second sheet of filtration media are discontinuous.

16. The filtration media pack of claim 15, wherein the first sheet of filtration media and the second sheet of filtration media define a cylindrical media pack with a wound cross-section.

17. The filtration media pack of claim 1, wherein the obstruction is a glue bead between the first sheet of filtration media and second sheet of filtration media.

18. The filtration media pack of claim 1, wherein the filtration media pack exhibits a flute density of at least about 40 flutes/inch$^2$.

19. The filtration media pack of claim 1, having an asymmetric volume arrangement such that an upstream volume of the filtration media pack is greater than a downstream volume by at least 10%.

20. A filtration media pack comprising:
- a first sheet of filtration media, the first sheet of filtration media comprising a first plurality of parallel flutes extending between a first edge of the first sheet of filtration media and a second edge of the first sheet of filtration media, wherein the first plurality of parallel flutes define first flute valleys extending between a first face of the filtration media pack and a second face of the filtration media pack;
- a second sheet of filtration media, the second sheet of filtration media comprising a second plurality of parallel flutes defining second flute peaks extending between the first face of the filtration media pack and the second face of the filtration media pack, wherein each first flute valley contacts one second flute peak at a discrete contact point,
- wherein the first plurality of parallel flutes are non-parallel to the second plurality of parallel flutes, wherein each of the first plurality of parallel flutes defines a curve relative to the first edge of the first sheet of filtration media and the second edge of the first sheet of filtration media;
- wherein the filtration media pack has a plurality of alternating first sheets of filtration media and second sheets of filtration media; and
- an obstruction between the first sheet of filtration media and the second sheet of filtration media to define a fluid pathway extending through the first sheet of filtration media and the second sheet of filtration media in parallel.

* * * * *